United States Patent [19]

Okuno

[11] Patent Number: 5,761,508
[45] Date of Patent: Jun. 2, 1998

[54] INFORMATION PROCESSING SYSTEM AND METHOD APPLIED TO THE DEVELOPMENT OF COMPUTER PROGRAMS

[75] Inventor: Hirotomo Okuno, Chofu, Japan

[73] Assignee: Asahi Kasei Kogyo Kabushiki Kaisha, Osaka, Japan

[21] Appl. No.: 775,625

[22] Filed: Jan. 2, 1997

Related U.S. Application Data

[63] Continuation of Ser. No. 119,227, filed as PCT/JP93/00095, Jan. 27, 1993, abandoned.

[30] Foreign Application Priority Data

Jan. 31, 1992 [JP] Japan .................... 4-016176

[51] Int. Cl.⁶ .................... G06F 15/00
[52] U.S. Cl. .................... 395/701; 395/703; 395/600; 395/650; 364/274.1; 364/275.1; 364/275.6; 364/282.1; 364/283.1; 364/274
[58] Field of Search .................... 395/700, 600, 395/DIG. 1, 701, 702, 703, 650; 364/274, 275, 282, 283.1

[56] References Cited

U.S. PATENT DOCUMENTS

| | | | |
|---|---|---|---|
| 4,648,037 | 3/1987 | Valentino | 364/408 |
| 4,742,457 | 5/1988 | Leon et al. | 364/408 |
| 4,953,085 | 8/1990 | Atkins | 364/408 |
| 5,179,698 | 1/1992 | Bachman et al. | 395/600 |
| 5,202,996 | 4/1993 | Sugino et al. | 395/700 |
| 5,261,100 | 11/1993 | Fujinami et al. | 395/700 |

FOREIGN PATENT DOCUMENTS

| | | |
|---|---|---|
| 60-159939 | 8/1985 | Japan . |
| 62-85336 | 4/1987 | Japan . |
| 62-241032 | 10/1987 | Japan . |
| 63-79176 | 4/1988 | Japan . |
| 64-76224 | 3/1989 | Japan . |
| 1-298434 | 12/1989 | Japan . |
| 2-207325 | 8/1990 | Japan . |
| 3-286226 | 12/1991 | Japan . |

OTHER PUBLICATIONS

"Tabular Languages", Fisher et al., Computer Programming Systems, Holt, Rinehart and Winston, Inc., Chapter 10, pp. 486–499, 1964.

"Parallel Structured Code Generator," *IBM Technical Disclosure Bulletin*, vol. 22, No. 7, Dec. 1979, New York, pp. 2722–2723, Dec. 1979.

"Decision Table Processing," *IBM Technical Disclosure Bulletin*, vol. 14, No. 9, Feb. 1972, New York, pp. 2845–2846 (and drawing page), Feb. 1972.

"Decision Table Translator," *IBM Technical Disclosure Bulletin*, vol. 13, No. 6, Nov. 1970, New York, pp. 1710–1713, Nov. 1970.

"Compilation of Nested Decision Tables," *IBM Technical Disclosure Bulletin*, vol. 20, No. 3, Aug. 1977, New York, pp. 985–986, Aug. 1977.

Fisher and Swindle, "Computer Programming Systems" 1964, Rinehart and Winston, pp. 486–499.

*Primary Examiner*—Lucien U. Toplu
*Assistant Examiner*—Majid A. Banankhah
*Attorney, Agent, or Firm*—Finnegan, Henderson, Farabow, Garrett & Dunner, L.L.P.

[57] ABSTRACT

An information processing system including a device (41) for generating a first table (33) indicating relationships between conditional items and operations, on the basis of identification symbols inserted into lists in a document, a device (42) for generating a second table (34) indicating relationships between variables in the list and external parameters, and a device (46) for generating source codes by sequentially picking up operations from the list on the basis of the first table, by using the second table. A program executing operations designated by the lists in the document is automatically generated by inputting the identification symbols.

62 Claims, 37 Drawing Sheets

(ADDITIONAL PENSION BENEFITS)
Article 22
   Additional pension benefits are as specified below.

1. Cause for paying additional pension benefits
   Payment of additional pension benefits starts, when an employee retires because of the cause except his or her death, after the service of twenty years or longer, and at the age of at least fifty.

2. Period for Payment 2.1) First Additional Pension
   First additional pension benefits are paid until the employee's death (beginning from a next month following a month of the occurrence of the cause for the payment, ending in a month of his or her death).

2.2) Second Additional Pension
   Second additional pension benefits are paid for the period of either fifteen (15) years or ten (10) years from a next month following a month of the occurrence of the cause for the payment, as selected by the employee who retires. In case that he or she dies during the period specified as a recipient, the payment ends in a month of his or her death.

3. Suspension of Pension Payment
   Pension payment is suspended until the retired employee becomes eligible for a recipient at the age of sixty. However, the pension payment date may be advanced to the lowest possible age of fifty five if the retired employee so elects.

4. An amount of money to be paid
   An amount of money is to be paid as computed on the basis of List 0

(SELECTIVE PAYMENT OF MONEY IN A LUMP SUM)

Article 23 selective payment of money in a lump sum is as specified below.

1. Cause for Selective Payment
   Selective payment is made if either of the following provisions is satisfied.

1.1) Where an employee who retires, after fulfilling the cause for payment of additional pension benefits, asks for the selective payment of money in a lump sum; or 1.2) Where a retired employee for whom the payment of additional pension benefits is suspended asks for the selective payment of money in a lump sum.

*FIG.2*

| LIST 0 | (STANDARDS FOR CALCULATING ADDITIONAL BENEFITS) | | |
|---|---|---|---|
| | | FIRST ADDITIONAL PENSION | SECOND ADDITIONAL PENSION |
| PENSION | PENSION (ANNUAL AMOUNT) | BASIC PENSION × LIST 1 × LIST 2 × LIST 3 (AMOUNT OF PENSION IS NOT REDUCED BY ADVANCE PAYMENT) | BASIC PENSION × LIST 4 × LIST 2 × LIST 3 × LIST 5 |
| LUMP SUM | LUMP SUM AT SURVIVOR'S RESIGNATION, LUMP SUM AT SURVIVOR'S RESIGNATION | ADDITIONAL PREMIUM PRINCIPAL × LIST 7 × LIST 2 | |
| | LUMP SUM AT SURVIVOR'S ADJUSTMENT, LUMP SUM AT ADJUSTMENT | BASIC PENSION × LIST 8 × LIST 2 (PERSONS OF INTEREST ARE PROVIDED WITH LUMP SUM AT SURVIVOR'S RESIGNATION AND LUMP SUM AT RESIGNATION) | |
| | SELECTIVE LUMP SUM — AT RETIREMENT, DURING SUSPENSION | BASIC PENSION × LIST 1 × LIST 2 × LIST 3 × LIST 6 | BASIC PENSION × LIST 4 × LIST 2 × LIST 3 × LIST 6 |
| | SURVIVOR'S LUMP SUM — DURING RECEPTION OF PENSION | AMOUNT OF PENSION × LIST 9 | |

LIST 1 (FIRST ADDITION)

| LENGTH OF SERVICE | RATE |
|---|---|
| 20 YEARS | 0.312 |
| 21 YEARS | 0.338 |
| 22 YEARS | 0.364 |
| 23 YEARS | 0.392 |
| 24 YEARS | 0.417 |
| ... | ... |
| ABOVE 30 YEARS | 0.588 |

LIST 2 (REDUCTION RATE BEFORE AGE OF 60)

| AGE AT RETIREMENT | RATE |
|---|---|
| BELOW 56 | 0.730 |
| BELOW 57 | 0.777 |
| BELOW 58 | 0.828 |
| BELOW 59 | 0.882 |
| BELOW 60 | 0.939 |
| 60 | 1.000 |

FIG. 3B

LIST 4 (SECOND ADDITION)

| LENGTH OF SERVICE | SELECTIVE TERM | |
|---|---|---|
| | 15 YEARS | 10 YEARS |
| 20 YEARS | 1.640 | 2.184 |
| 21 YEARS | 1.777 | 2.367 |
| 22 YEARS | 1.912 | 2.547 |
| 23 YEARS | 2.058 | 2.741 |
| ... | ... | ... |
| ABOVE 30 YEARS | 1.640 | 2.184 |

LIST 5 (IN CASE OF ADVANCE PAYMENT)

| AGE AT WHICH PAYMENT STARTS | RATE |
|---|---|
| 55 - 56 | 0.684 |
| 56 - 57 | 0.741 |
| 57 - 58 | 0.800 |
| 58 - 59 | 0.863 |
| 59 - 60 | 0.930 |
| 60 | 1.000 |

| | |《(LIST 0 (STANDARDS FOR CALCULATING ADDITIONAL BENEFITS)》 | |
|---|---|---|---|
| | | 《(2)FIRST ADDITIONAL PENSION | SECOND ADDITIONAL PENSION》 |
| PENSION | 《(1) PENSION (ANNUAL AMOUNT) | 《(3) BASIC PENSION》 × LIST 1 × LIST 2 × LIST 3 (AMOUNT OF PENSION IS NOT REDUCED BY ADVANCE PAYMENT) | 《(3) BASIC PENSION》 × LIST 2 × LIST 4 × LIST 5 × LIST 3 |
| | LUMP SUM AT SURVIVOR'S RESIGNATION, LUMP SUM AT RESIGNATION | 《(4)ADDITIONAL PREMIUM PRINCIPAL》 × LIST 7 × LIST 2 | |
| LUMP SUM | LUMP SUM AT SURVIVOR'S ADJUSTMENT, LUMP SUM AT ADJUSTMENT 《(1)-(1) | 《(3) BASIC PENSION》 × LIST 8 × LIST 2 (PERSONS OF INTEREST ARE PROVIDED WITH LUMP SUM AT SURVIVOR'S RESIGNATION AND LUMP SUM AT RESIGNATION) | |
| | SELECTIVE LUMP SUM — AT RETIREMENT, DURING SUSPENSION | 《(3) BASIC PENSION》 × 《(6)LIST 1》 × 《(7)LIST 2》 × 《(2)LIST 3》 × 《(8)LIST 3》 × 《(2)LIST 6》 | 《(3) BASIC PENSION》 × LIST 2 × LIST 4 × LIST 6 × LIST 3 |
| | SURVIVOR'S LUMP SUM — DURING RECEPTION OF PENSION | 《(5) AMOUNT OF PENSION》 × LIST 9 | |

FIG.4

| FIG.4A | |
|---|---|
| FIG.4B | FIG.4C |

LIST 2 (REDUCTION RATE BEFORE AGE OF 60)

| AGE AT RETIREMENT | RATE |
|---|---|
| ((7) BELOW 56 | 0.730 |
| BELOW 57 | 0.777 |
| BELOW 58 | 0.828 |
| BELOW 59 | 0.882 |
| BELOW 60 )} | 0.939 |
|  | 1.000 |

LIST 1 (FIRST ADDITION)

| LENGTH OF SERVICE | RATE |
|---|---|
| ((6)20 YEARS | 0.312 |
| 21 YEARS | 0.338 |
| 22 YEARS | 0.364 |
| 23 YEARS | 0.392 |
| 24 YEARS | 0.417 |
|  |  |
| ABOVE 30 YEARS )} | 0.588 |

LIST 5 (IN CASE OF ADVANCE PAYMENT)

| AGE AT WHICH PAYMENT STARTS | RATE |
|---|---|
| 55 - 56 | 0.684 |
| 56 - 57 | 0.741 |
| 57 - 58 | 0.800 |
| 58 - 59 | 0.863 |
| 59 - 60 | 0.930 |
| 60 | 1.000 |

LIST 4 (SECOND ADDITION)

| LENGTH OF SERVICE | SELECTIVE TERM | |
|---|---|---|
| | 15 YEARS | 10 YEARS |
| 20 YEARS | 1.640 | 2.184 |
| 21 YEARS | 1.777 | 2.367 |
| 22 YEARS | 1.912 | 2.547 |
| 23 YEARS | 2.058 | 2.741 |
| ABOVE 30 YEARS | 1.640 | 2.184 |

```
LIST  0           'P1  ='  SELECTIVE LUMP SUM,          'P1-1 ='          AT RETIREMENT,
                  'P2  ='  FIRST ADDITIONAL PENSION,    'P3   ='  200000,
                  'P4  ='  ,                            'P5   ='  ,

LIST  1           'P6  ='  22 YEARS,
LIST  2           'P7  ='  BELOW 57,
LIST  3           'P8  ='  BELOW 53,
LIST  4           'P9  ='  23 YEARS,
                  'P10 ='  10 YEARS,
LIST  5           'P11 ='  ,
LIST  6           'P12 ='  BELOW 58,
LIST  7           'P13 ='  ,
LIST  8           'P14 ='  ,
LIST  9           'P15 ='  ,
```

| LIST NAME VERSUS LIST STORING POSITION TABLE ||
|---|---|
| LIST NAME | POSITION INFORMATION ON LIST LOCATION |
| LIST 0 | POINTER TO LOCATION OF LIST 0 |
| LIST 1 | POINTER TO LOCATION OF LIST 1 |
| LIST 2 | POINTER TO LOCATION OF LIST 2 |
| . . . | . . . |

| TABLE OF CONDITIONAL COLUMNS (1) AND (1)-(1) OF LIST 0 | | |
|---|---|---|
| EXTERNAL PARAMETERS | | |
| P1 | P1-1 | CONDITIONAL ITEM NUMBERS |
| PENSION | — | 1 |
| LUMP SUM AT SURVIVOR'S RESIGNATION | — | 2 |
| LUMP SUM AT RESIGNATION | — | 2 |
| LUMP SUM AT SURVIVOR'S ADJUSTMENT | — | 3 |
| LUMP SUM AT ADJUSTMENT | — | 3 |
| SELECTIVE LUMP SUM | AT RETIREMENT | 4 |
| SELECTIVE LUMP SUM | DURING SUSPENSION | 4 |
| SURVIVOR'S LUMP SUM | AT RETIREMENT | 4 |
| SURVIVOR'S LUMP SUM | DURING SUSPENSION | 4 |
| SELECTIVE LUMP SUM | DURING RECEPTION OF PENSION | 5 |
| SURVIVOR'S LUMP SUM | DURING RECEPTION OF PENSION | 5 |

*FIG. 11*

| TABLE OF CONDITIONAL ROW (2) OF LIST 0 ||
|---|---|
| EXTERNAL PARAMETER P2 | CONDITIONAL ITEM NUMBERS |
| FIRST ADDITIONAL PENSION | 1 |
| SECOND ADDITIONAL PENSION | 2 |

| i | j | OPERATIONS |
|---|---|---|
| | | TABLE ASSOCIATING CONDITIONAL ITEM NUMBERS WITH OPERATIONS IN LIST 0 |
| 1 | 1 | <<(3) BASIC PENSION>> × LIST 1 × LIST 2 × LIST 3 |
| 2 | 1 | <<(4) ADDITIONAL PREMIUM PRINCIPAL>> × LIST 7 × LIST 2 |
| 3 | 1 | <<(3) BASIC PENSION>> × LIST 8 × LIST 2 |
| 4 | 1 | <<(3) BASIC PENSION>> × LIST 1 × LIST 2 × LIST 3 × LIST 6 |
| 5 | 1 | <<(5) AMOUNT OF PENSION>> × LIST 9 |
| 1 | 2 | <<(3) BASIC PENSION>> × LIST 4 × LIST 2 × LIST 3 × LIST 5 |
| 2 | 2 | <<(4) ADDITIONAL PREMIUM PRINCIPAL>> × LIST 7 × LIST 2 |
| 3 | 2 | <<(3) BASIC PENSION>> × LIST 8 × LIST 2 |
| 4 | 2 | <<(3) BASIC PENSION>> × LIST 4 × LIST 2 × LIST 3 × LIST 6 |
| 5 | 2 | <<(5) AMOUNT OF PENSION>> × LIST 9 |

FIG. 13

EXTERNAL PARAMETER TABLE

| CONDITIONAL ITEMS AND VARIABLES | SEQUENCE INFORMATION | NAMES OF EXTERNAL PARAMETERS | LIST NAMES IN USE | | |
|---|---|---|---|---|---|
| | | | LEVEL1 | LEVEL2 | LEVEL3 |
| CONDITIONAL COLUMN | L1 | P1 | LIST 0 | — | — |
| CONDITIONAL COLUMN | L1-1 | P1-1 | LIST 0 | — | — |
| CONDITIONAL ROW | L2 | P2 | LIST 0 | — | — |
| BASIC PENSION | L3 | P3 | LIST 0 | — | — |
| PREMIUM ADDITIONAL PRINCIPAL | L4 | P4 | LIST 0 | — | — |
| AMOUNT OF PENSION | L5 | P5 | LIST 0 | — | — |
| CONDITIONAL COLUMN | L6 | P6 | LIST 0 | LIST 1 | — |
| CONDITIONAL COLUMN | L7 | P7 | LIST 0 | LIST 2 | — |
| .. | .. | .. | .. | .. | .. |

| TABLE FOR CONDITIONAL COLUMNS OF LIST 1 ||
|---|---|
| EXTERNAL PARAMETER P6 | CONDITIONAL ITEM NUMBER i |
| 20 YEARS | 1 |
| 21 YEARS | 2 |
| 22 YEARS | 3 |
| 23 YEARS | 4 |
| ⋮ | ⋮ |

| TABLE ASSOCIATING CONDITIONAL ITEM NUMBERS WITH OPERATIONS IN LIST 1 ||
|---|---|
| i | OPERATIONS |
| 1 | 0.312 |
| 2 | 0.338 |
| 3 | 0.364 |
| 4 | 0.392 |
| 5 | 0.417 |
| ⋮ | ⋮ |

| FIG.17 |
|---|
| FIG.17A |
| FIG.17B |

PM1

SUBPROGRAM LINKAGE PORTION

Declare interface about the linkage to a main program.
The declaration of interface includes:

(1) Declaration of subprogram name.
(2) Declaration of the sequence, number and data attributes of external parameters that are associated with conditional items, variables, and resultant values of the processings of the subprograms.

PROGRAM-ID.    LIST 0    example of declaration
                         of subprogram name

PROTOTYPE OF
SUBPROGRAM TO
BE GENERATED

%xxx portions of the
prototype are changed
in accordance with
external parameters and
contents of lists
to be processed

PM1A

PROGRAM ID.
%subprogram.

```
LINKAGE SECTION
77  %p1  PIC  %type.
77  %p2  PIC  %type.
77  %p3  PIC  %type.
77  %p4  PIC  %type.
  . . .
77  %RESULTANT
    VALUE PIC %type.
77  %RESULTANT
    VALUE PIC %type.
PROCEDURE DIVISION
USING %p1, %p2,
    %p3, %p4, . . .
%RESULTANT VALUE 1,
%RESULTANT VALUE 2,
``` examples of declaration on data attributes of external parameters and variables

⇩

```
LINKAGE SECTION
77  P1    PIC  X(30).
77  P1-1  PIC  X(30).
77  P2    PIC  X(30).
77  P3    PIC  9(18).
  . . .
77  RESULTANT VALUES PIC 9(18).

PROCEDURE DIVISION
USING P1, P1-1, P2, P3, . . .
RESULTANT VALUES
``` examples of declaration on sequence and number of external parameters and variables

*FIG. 17B*

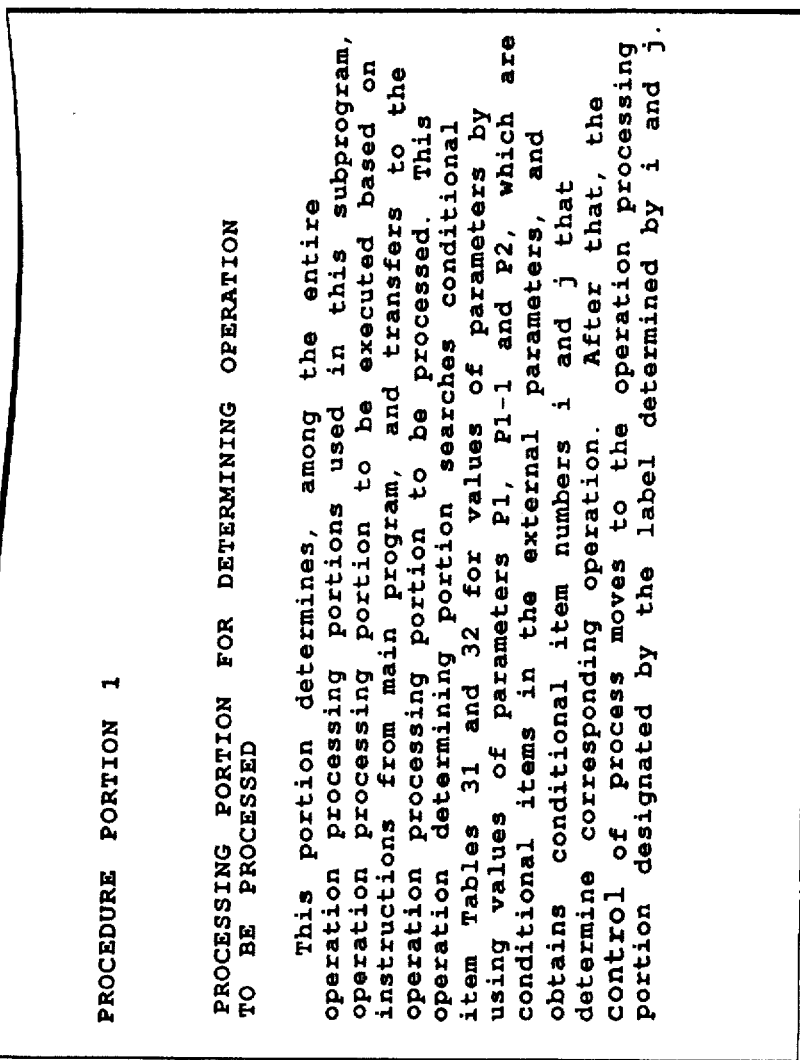
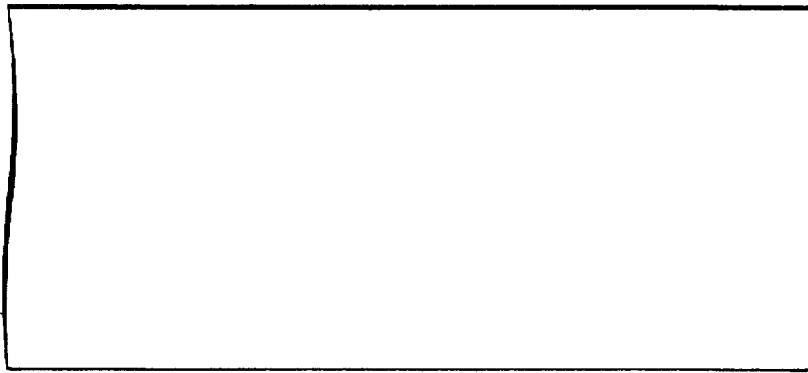
FIG.18A

```
SET IX1 TO 1.
SEARCH T31
    WHEN  T31P1(IX1) = P1 AND
          T31P1-1(IX1) = P1-1
    MOVE  T31SUB(IX1) TO I.
END SEARCH.
SET IX2 TO 1.
SEARCH T32
    WHEN  T32P2(IX2) = P2
    MOVE  T32SUB(IX2) TO J
END SEARCH.

IF I = 1 AND J =1         GO TO 11.
  .
  .
IF I = i AND J = j        GO TO ij.
```

⇩

```
SET %ix TO 1.
SEARCH %ixt
    WHEN  %ixp1(%ix)
          = %ix1
    AND   %ixp2(%ix)
          = %ix2
    MOVE  %ixsub(%ix)
          TO %ixn
END SEARCH.

IF I = %ixi AND
   J = %ixj
GO TO %ixi%ixj.
```

PROCEDURE PORTION 2

OPERATION PROCESSING PORTION
    This portion describes operations associated with labels determined by i and j in accordance with Tables 33 listing correspondences between conditional item numbers and operations, and executes operations which are labeled by ij determined in PM2.

```
    11   description of corresponding operation.
         GO TO last
              .
              .
    41   RESULTANT VALUE = P3 × funcList 1 (P6)
                              × funcList 2 (P7)
                              × funcList 3 (P8)
                              × funcList 6 (P12)

GO TO last
              .
              .
              .
    ij   description of corresponding operation.
         GO TO last
              .
              .
              .
last     return
         end
```

SUBPROGRAM LINKAGE PORTION
Declare interface about the linkage to a main program.
The declaration of interface includes:
(1) Declaration of subprogram name.
(2) Declaration of the sequence, number and data attributes of external parameters that are associated with conditional items, variables, and resultant values of the processings of the subprograms.

PROGRAM ID.   LIST 1   example of declaration of subprogram name

PROTOTYPE OF SUBPROGRAM
TO BE GENERATED

%xxx portions of the prototype are changed in accordance with external parameters and contents of lists to be processed

PM4A

PROGRAM ID.
  %subprogram.

```
LINKAGE SECTION
77 %p1 PIC %type.
77 %p2 PIC %type.
77 %p3 PIC %type.
77 %p4 PIC %type.
 ...
77 %RESULTANT
   VALUE PIC %type.
77 %RESULTANT
   VALUE PIC %type.

PROCEDURE DIVISION
USING %p1, %p2,
      %p3, %p4, ...
      %RESULTANT
       VALUE 1,
      %RESULTANT
       VALUE 2, ..
```

⇓ examples of declaration on data attributes of external parameters and variables ⇓ examples of declaration on sequence and number of external parameters and variables

```
LINKAGE SECTION
77 P6      PIC X(30).
 ...
77 RESULTANT VALUES
   PIC 9(18).

PROCEDURE DIVISION
USING P6, ...
  .. RESULTANT VALUES
```

PROCEDURE PORTION 1

PROCESSING PORTION FOR DETERMINING OPERATION TO BE PROCESSED

This portion determines, among the entire operation processing portions used in this subprogram, operation processing portion to be executed based on instructions from main program, and transfers to the operation processing portion to be processed. This operation determining portion searches conditional item Table 35 for a value of the parameter by using the value of parameter P6, which is a conditional item in the external parameters, and obtains conditional item number i that determines corresponding operation. After that, the control of process moves to the operation processing portion designated by the label determined by i.

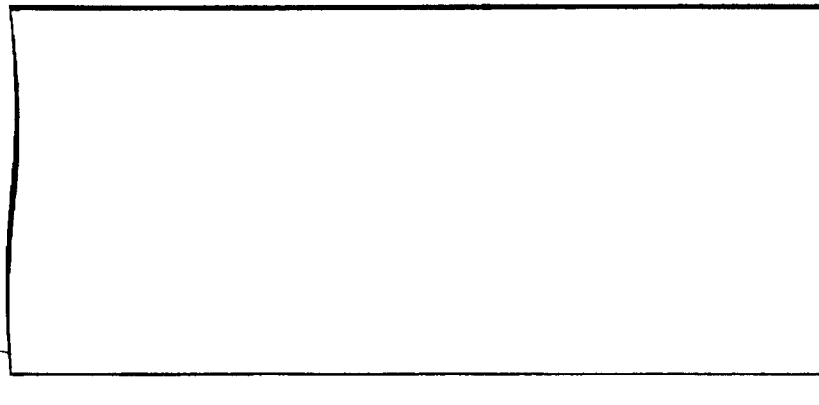

| FIG. 21 |
|---|
| FIG. 21A |
| FIG. 21B |

```
SET %ix TO 1.
SEARCH %ixt
    WHEN %ixp1(%ix)
       = %ix1 AND
         %ixp2(%ix)
       = %ix2
         ..
    MOVE %ixsub(%ix)
      TO %ixn
END SEARCH.

IF I = %ixi AND
   J = %ixj
   GO TO %ixi%ixj.
```

```
SET IX1 TO 1.
SEARCH T35
    WHEN T35P6(IX1) = P6
    MOVE T35SUB(IX1) TO I.
END SEARCH.

```
PROCEDURE PORTION 2

OPERATION PROCESSING PORTION
     This portion describes operations associated
  with labels determined by i in accordance with
  Tables 36 listing correspondences between
  conditional item numbers and operations, and
  executes operations which are labeled by i
  determined in PM5.

1     description of corresponding operation.
           GO TO last
                  .
                  .
     3     RESULTANT VALUE = 0.364
           GO TO last
                  .
                  .
     i     description of corresponding operation.
           GO TO last

.
                  .
                  .
                  .

last         return
               end
```

FIG.22

LIST 101: LIST OF NUMBERS OF PERSONS FOR SCORE RANGE AND SUBJECTS

| <<(1) SCORE RANGE>> | <<(2) JAPANESE>> | <<(3) MATHEMATICS>> | <<(4) ENGLISH>> |
|---|---|---|---|
| {( 0 – 20 | 5 | 3 | 1 |
| 20 – 40 | 12 | 16 | 9 |
| 40 – 60 | 28 | 32 | 22 |
| 60 – 80 | 12 | 6 | 18 |
| 80 – 100)} | 3 | 3 | 10 |

LIST 102: LIST OF NUMBERS OF PERSONS FOR SEX, SCORE RANGE AND SUBJECTS

<<(4) NUMBERS OF PERSONS>>

| <<(1) SEX>> | <<(2) SCORE RANGE>> | <<(3) SUBJECTS>> | | |
|---|---|---|---|---|
| | | JAPANESE | MATHEMATICS | ENGLISH |
| MALE | 0 - 20 | 2 | 2 | 1 |
| | 20 - 40 | 6 | 8 | 6 |
| | 40 - 60 | 26 | 14 | 10 |
| | 60 - 80 | 5 | 4 | 9 |
| | 80 - 100 | 1 | 2 | 4 |
| FEMALE | 0 - 20 | 3 | 1 | 0 |
| | 20 - 40 | 6 | 8 | 3 |
| | 40 - 60 | 12 | 18 | 12 |
| | 60 - 80 | 7 | 2 | 9 |
| | 80 - 100 | 2 | 1 | 6 |

| LIST 103: DECISION LIST | |
|---|---|
| <<(1) DECISION CONDITION>> | <<(4) DECISION>> |
| { [ 0 ≤ (0.75 × <<(2)X>> + 0.25 × <<(3)Y>>) < 50 | 0 : UNSUITABLE |
| 50 ≤ (0.75 × <<(2)X>> + 0.25 × <<(3)Y>>) ≤ 100 ] } | 1 : SUITABLE |

| i | j | OPERATION | POSITION INFORMATION | |
|---|---|---|---|---|
| 1 | 1 | <<(3) BASIC PENSION>><br>LIST1 × LIST2 × LIST3 | ADDRESS 1 - ADDRESS 6 | |
| 2 | 1 | <<(4) ADDITIONAL PREMIUM PRINCIPAL>><br>LIST7 × LIST2 | ADDRESS 7 - ADDRESS 11 | |
| .. | .. | .. | .. | |

73 { 33, 71 }

INTERMEDIATE LANGUAGE TABLE (OPERATION)  76  77  78  75,79  80

| (ADDRESS) | TYPE | RESULTS | OPERATION ITEMS 1 | OPERATORS | OPERATION ITEMS 2 | (VALUE EXAMPLES ENTERED INTO RESULTANT COLUMN AFTER CALCULATION) |
|---|---|---|---|---|---|---|
| 1 | 41 | | LIST 1 | | | 0.364 |
| 2 | 41 | | LIST 2 | | | 0.777 |
| 3 | 41 | | LIST 3 | | | 0.9 |
| 4 | 31 | | BASIC PENSION | × | ADDRESS 1 | 782800 |
| 5 | 31 | | ADDRESS 4 | × | ADDRESS 2 | 56565.6 |
| 6 | 32 | PENSION (ANNUAL AMOUNT) | ADDRESS 5 | × | ADDRESS 3 | |
| .. | .. | .. | .. | .. | .. | |

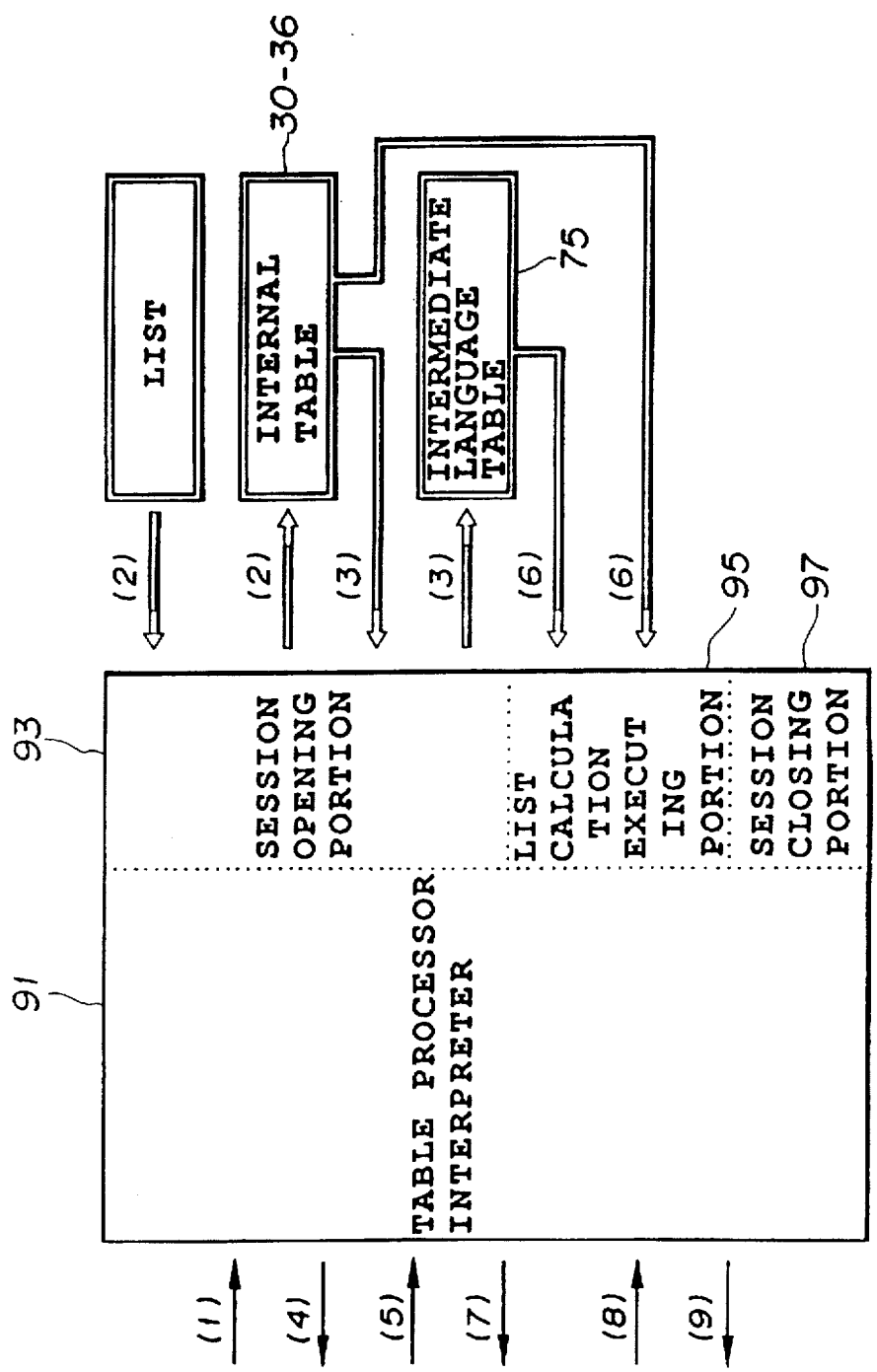

INFORMATION PROCESSING SYSTEM AND METHOD APPLIED TO THE DEVELOPMENT OF COMPUTER PROGRAMS

This is a continuation of application Ser. No. 08/119,227, filed Sep. 28, 1993, which is a §371 filing of PCT/JP93/00095, filed Jan. 27, 1993, now abandoned.

TECHNICAL FIELD

The present invention relates to an information processing system and method preferably applied to the development of software.

BACKGROUND ART

In developing software needed by an information processing unit, the process called programming must be performed to complete programs after the specification of a system to be developed has been prepared. This process, which requires understanding the specification and preparing programs, is labor intensive because it is chiefly carried out manually. Besides, it is not rare that the process involves unexpected errors based on misunderstanding of the specification. Moreover, similar accidents can occur in a maintenance process carried out in accordance with modification of the specification and the like after the operation of the information system has begun. This will delay the maintenance and may induce further errors.

Under these circumstances, table expressions have been used to help understanding a specification. Decision tables are known in the art as one of such expressions (for example, Fisher and Swindle, "Computer Programming Systems", Holt, Rinehart and Winston Inc, 1964, pages 486 ff.)

However, it is difficult for the untrained to understand the decision tables, and the expressions thereof are redundant. Accordingly, the decision tables are difficult to use in developing software. Furthermore, since the logic structures of the decision tables are fixed, they cannot cope with various list formats.

DISCLOSURE OF THE INVENTION

Therefore, it is an object of the present invention to provide an information processing system and method, which can prevent errors from occurring and being included during the system development and maintenance, and which can reduce labor, and shorten programming.

An information processing system according to the present invention comprises:
display means for displaying a first list including a plurality of operations, and one or more conditional items for specifying each one of the plurality of operations;
first designating means for designating the conditional items in the first list displayed;
second designating means for designating variables in the first list displayed, the variables being specified by external parameters;
first table generating means for generating a first table indicating relationships between the conditional items and each one of the operations;
second table generating means for generating a second table indicating relationships between the variables in the first list and the external parameters; and
program generating means for converting the operations into source codes using the second table by sequentially picking up each one of the operations from the first list on the basis of the first table.

An information processing system according to the present invention comprises:
display means for displaying a first list including a plurality of operations, and at least one conditional item for specifying each one of the plurality of operations;
first designating means for designating the conditional item in the first list displayed;
means for inputting external parameters for specifying values of variables in the first list;
second designating means for designating, in the first list displayed, variables whose values are specified by the external parameters;
means for generating a first table indicating relationships between the conditional item and each one of the operations;
means for generating a second table indicating relationships between the variables in the first list and the external parameters; and
executing means for executing, by using the second table, the operations having been selected on the basis of the first list and the conditional item specified by the external parameters.

An information processing method according to the present invention comprises the steps of:
displaying a first list including a plurality of operations, and one or more conditional items for specifying each one of the plurality of operations;
specifying the conditional items on the basis of instructions in the first list displayed;
designating variables on the basis of instructions in the first list displayed, the variables being specified by external parameters;
generating a first table indicating relationships between the conditional items and each one of the operations;
generating a second table indicating relationships between the variables in the first list and the external parameters; and
converting the operations into source codes using the second table by sequentially picking up each one of the operations from the first list on the basis of the first table.

An information processing method according to the present invention comprises the steps of:
displaying a first list including a plurality of operations, and at least one conditional item for specifying each one of the plurality of operations;
specifying the conditional item on the basis of instructions in the first list displayed;
inputting external parameters for specifying values of variables in the first list;
specifying variables whose values are specified by the external parameters on the basis of instructions in the first list displayed;
generating a first table indicating relationships between the conditional item and each one of the operations;
generating a second table indicating relationships between the variables in the first list and the external parameters; and
executing, by using the second table, the operations having been selected on the basis of the first table and the conditional item specified by the external parameters.

According to the present invention, a program, which executes operations selected from a list defining the operations, is automatically generated on the basis of external parameters selectively designating the operations and operands. As a result, the development and maintenance of programs can be quickly and easily carried out. Here, lists in working regulations for regulating work, lists in a system specification describing a system, etc., are typical examples of such lists. In addition, calculations of premium rates and allotments, determination of program control structures, and other operations are typical examples of such operations.

According to the present invention, software modules that process logical structures or control structures expressed in a plurality of lists are automatically generated on the basis of working regulations for regulating work, system specifications specifying systems, or user manuals, by means of simple manual instructions for these documents. Therefore, the present invention can reduce the quantity of manual operation in the system development and maintenance, and implement high-speed, error-free processings.

BRIEF DESCRIPTION OF THE DRAWINGS

FIG. 2 shows an example of retirement pension regulations;

FIGS. 3A–3C show an example of Lists in the retirement pension regulations;

FIGS. 4A–4C explain addition of identification symbols representing structures of Lists and links between Lists;

FIG. 5 illustrates an example of external parameters;

FIG. 10 is a schematic diagram showing a structural example of Table 30;

FIG. 11 is a schematic diagram showing a structural example of Table 31;

FIG. 12 is a schematic diagram showing a structural example of Table 32;

FIG. 13 is a schematic diagram showing a structural example of Table 33;

FIG. 14 is a schematic diagram showing a structural example of Table 34;

FIG. 15 is a schematic diagram showing a structural example of Table 35;

FIG. 16 is a schematic diagram showing a structural example Table 36;

FIGS. 17A, 17B, 18A, 18B and 19 show a structural example of a generated subprogram of List 0;

FIGS. 20A, 20B, 21A, 21B and 22 show a structural example of a generated subprogram of List 1;

FIG. 24 shows an example of a List, from which a plurality of output items are obtained by designating a single external parameter;

FIG. 25 shows an example of a List comprising conditional columns taking a tree structure;

FIG. 26 shows an example of a List including variables in conditional items;

FIG. 27 shows an example of Intermediate Language Table in a second embodiment of an information processing system in accordance with the present invention; and FIG. 28 is a block diagram showing an arrangement of the second embodiment.

BEST MODE FOR CARRYING OUT THE INVENTION

Next, embodiments in accordance with the present invention will be described in detail.

The embodiments described below relates to an information processing system which is employed to develop software associated with retirement pension regulations.

EMBODIMENT 1

Figure 1:
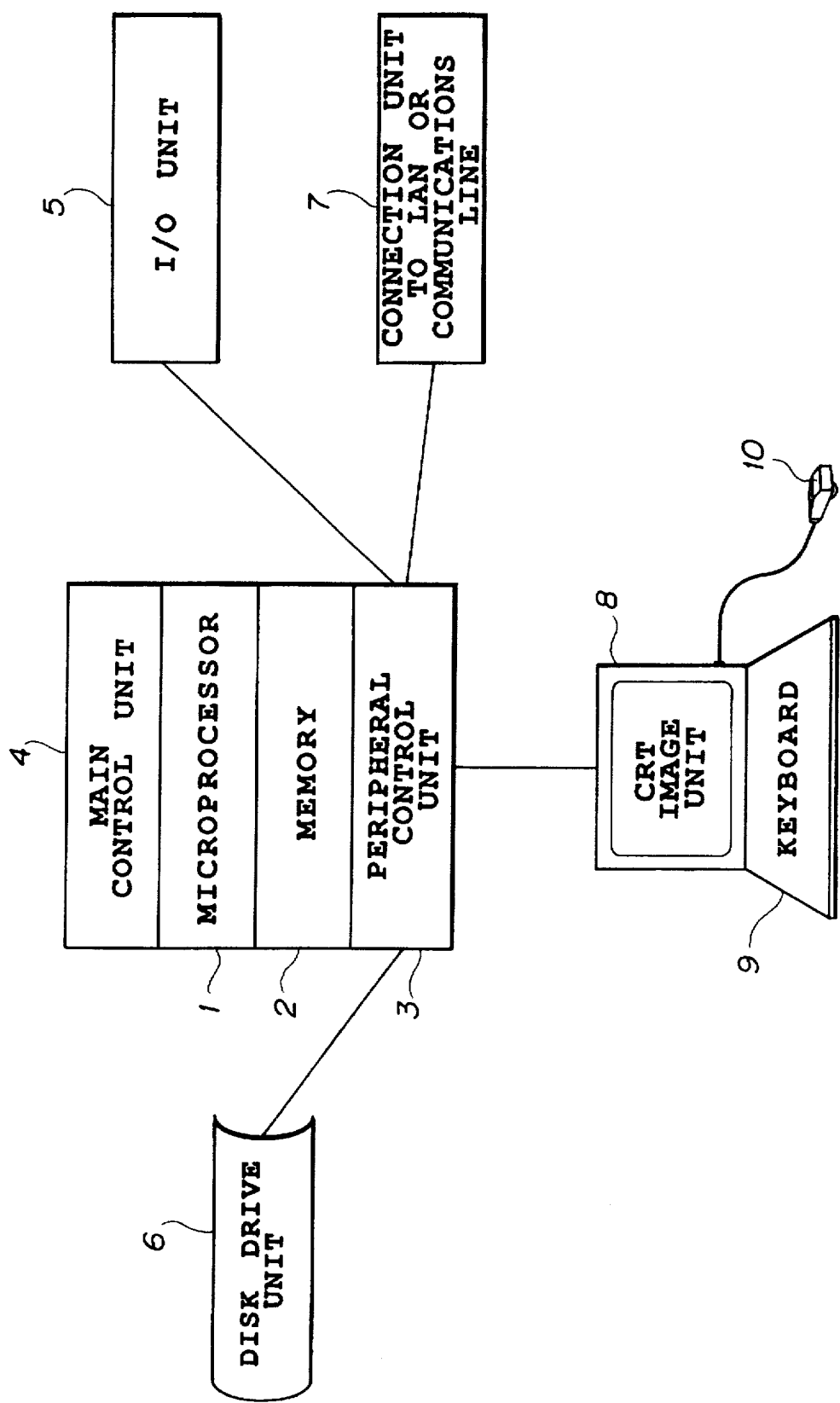
FIG. 1 is a block diagram showing a first embodiment of an information processing system in accordance with the present invention.

FIG. 1 is a block diagram showing the entire arrangement of a first embodiment of an information processing system in accordance with the present invention. In this figure, a main control unit 4 comprises a microprocessor 1, a memory 2 and a peripheral control unit 3. An I/O unit 5 comprises a cartridge tape drive for reading a document prepared by a word processor or the like. A disk drive 6 is for storing various information, and a connection unit 7 to a LAN or communications lines is provided for transmitting and receiving data to and from other information systems. In addition, an interactive unit, which comprises a CRT image unit 8, a keyboard 9 and a mouse 10, displays documents or Lists, and accepts inputs from the keyboard or the mouse manipulated by an operator.

FIGS. 2 and 3A–3C show a part of a working regulations specifying additional benefits and the like. Such regulations comprises text as shown in FIG. 2 and Lists as shown in FIGS. 3A–3C. The Lists and terms used in this specification will be explained below.

In FIG. 3A, List 0 determines a method for calculating additional pension benefits. The leftmost column of the List represents the types of benefits such as a pension, types of lump sums, whereas the top row of the List represents the types of additions such as a first additional pension, a second additional pension. These blocks are referred to as the conditional column and the conditional row. Individual conditional items in the conditional columns and rows can provide values such as lump sums and the like. In addition, they may provide conditional expressions or formulae for generating these values. The blocks designated by these conditional items define methods for calculating additional benefits by a formula such as (Basic Pension×List 1×List 2×List 3×List 6). The processings defined in individual blocks designated by the conditional items are referred to as an operation in this specification. The processing includes the four fundamental rules of arithmetic, definition, replacement, etc. The operation comprises an operator and an operand, and the operator defines the action to be performed on the operand. Thus, a conditional item in the conditional column and a conditional item in the conditional row can designate an operation in List 0. The operands include variables whose values are designated from outside, and variables which are used only inside.

On the other hand, Lists 1, 2, ... 5, ... define premium rates that are determined by the length of service, ages, and so on. In these figures, the leftmost columns, for example, the column whose contents are "20 years, ..., beyond 30 years" of List 1, are conditional columns. The blocks designated by individual items of these conditional columns contain premium rates functioning as operations. In other words, each operation in Lists 1, . . . . . 5, . . . is defined as an operation that outputs a value entered in these Lists.

FIG. 5 shows an example of external parameters. Here, the external parameters are provided from the outside in order to specify the values of variables in the Lists. For example, the external parameters P1 and P1-1 designate conditional items in the conditional columns of List 0, and the external parameter P2 designates a conditional item in the conditional row in List 0. In this case, P1 designates "selected lump sum", P1-1 designates "at retirement", and P2 designates "the first additional pension benefits". Accordingly, the operation determined by the conditional items designated by the external parameters is equation 21 in FIG. 4A, which is expressed as Basic Pension×List 1×List 2×List 3×List 6

Next, the parameter P3 designates a specific value of the basic pension as an operand. The parameters P4 and P5 are not designated and remain as blank because they are not used in this operation. The parameter P6 designates one of the conditional items in the conditional column of List 1. Thus, the conditional items in individual conditional columns and rows in List 0, and 1-9 are designated, by which the operation in the respective Lists are designated. The values of external parameters are given, during the execution of the generated program, by other application software of this system, or by external information processing systems through communications lines. In practice, the external parameters are given in such a manner that the left-hand sides like P1=, P2=, . . . P15= are omitted, and only the right-hand sides are given sequentially. Accordingly, the external parameters are provided in a form that the external parameters are simply placed in such an order as a selected lump sum, at retirement, the first additional pension, . . . , 22 years, under age of 58, etc. In other words, they are arranged as parameters for calling a subroutine.

Figure 6:
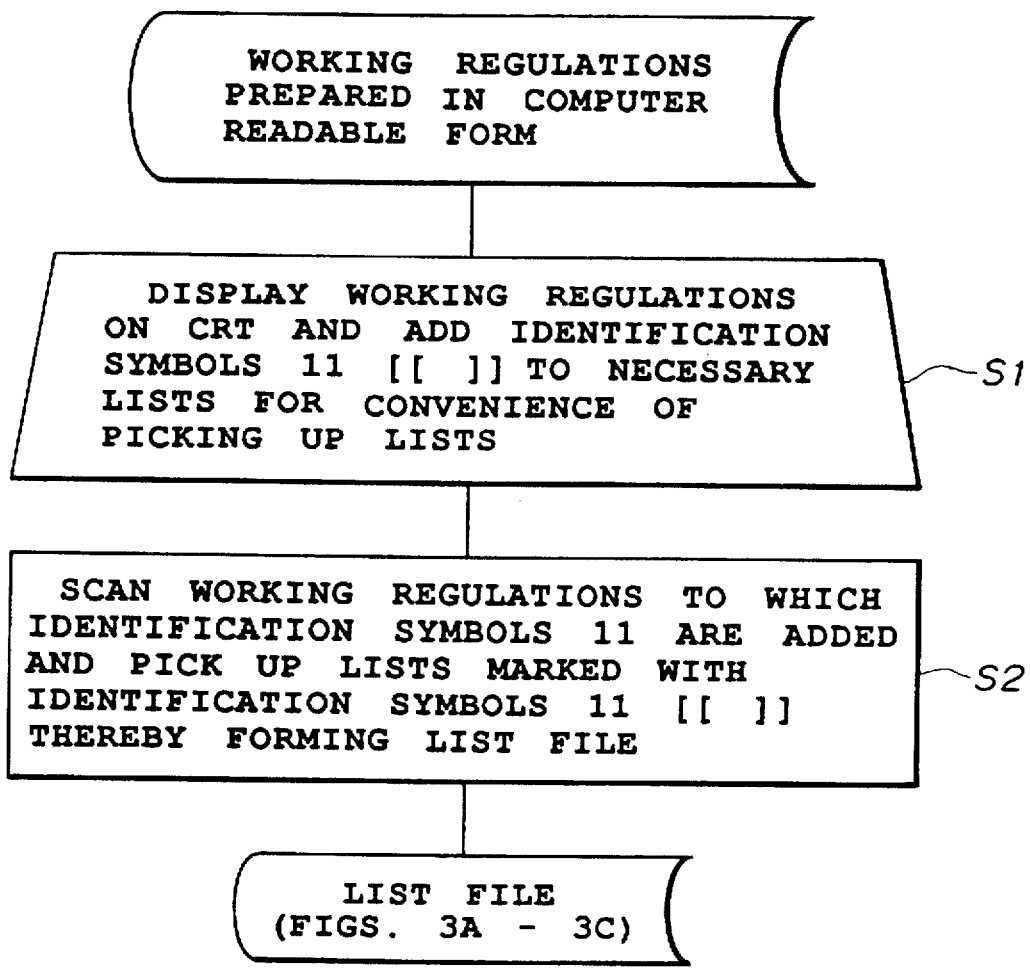
FIG. 6 is a flowchart showing the operation for extracting Lists.

Next, a method for picking up Lists, conditional items, and operations is described with reference to the flowchart shown in FIGS. 6-8.

First, at step S1, the entire document of retirement pension regulations which have been prepared by a word processor is read from a tape in the cartridge tape drive in the I/O unit 5, and is written on a disk in the disk drive 6 as a regulation file. Subsequently, the working regulations are sequentially read from the disk in the disk drive 6, and displayed on the CRT image unit 8. This document includes the Lists as shown in FIGS. 3A-3C, and they appear sequentially on the screen. Specifically, Lists 0, 1, . . . are sequentially displayed which define operations for calculating the additional pension benefits. Here, an operator designates Lists by using an identification symbol 11 ([[ ]]). More specifically, the operator adds the identification symbol 11 to the top left corner and bottom right corner of individual Lists as shown in FIGS. 3A-3C in order to designate the Lists to be processed. The Lists designated are highlighted for confirmation. The Lists to which the identification symbols 11 are added are written into a disk in the disk drive 6. After the processings have been completed over the entire regulations, a new regulation file is generated, in which the identification symbols 11 are added to all the Lists.

Next, at step S2, the Lists are picked up as follows: First, the regulation file including the identification symbols 11 is read from the disk in the disk drive 6 into the memory 2.

The regulations on the memory 2 are scanned so that the Lists designated by the identification symbols 11 are searched for, and are stored as a new file. All the necessary Lists are picked up by repeating this process over the entire pages. Thus, a list file has been prepared.

Once the list file has been completed, programs for executing operations are generated on the basis of the Lists which define the operations. However, before generating the programs, various tables are prepared.

Figure 7:
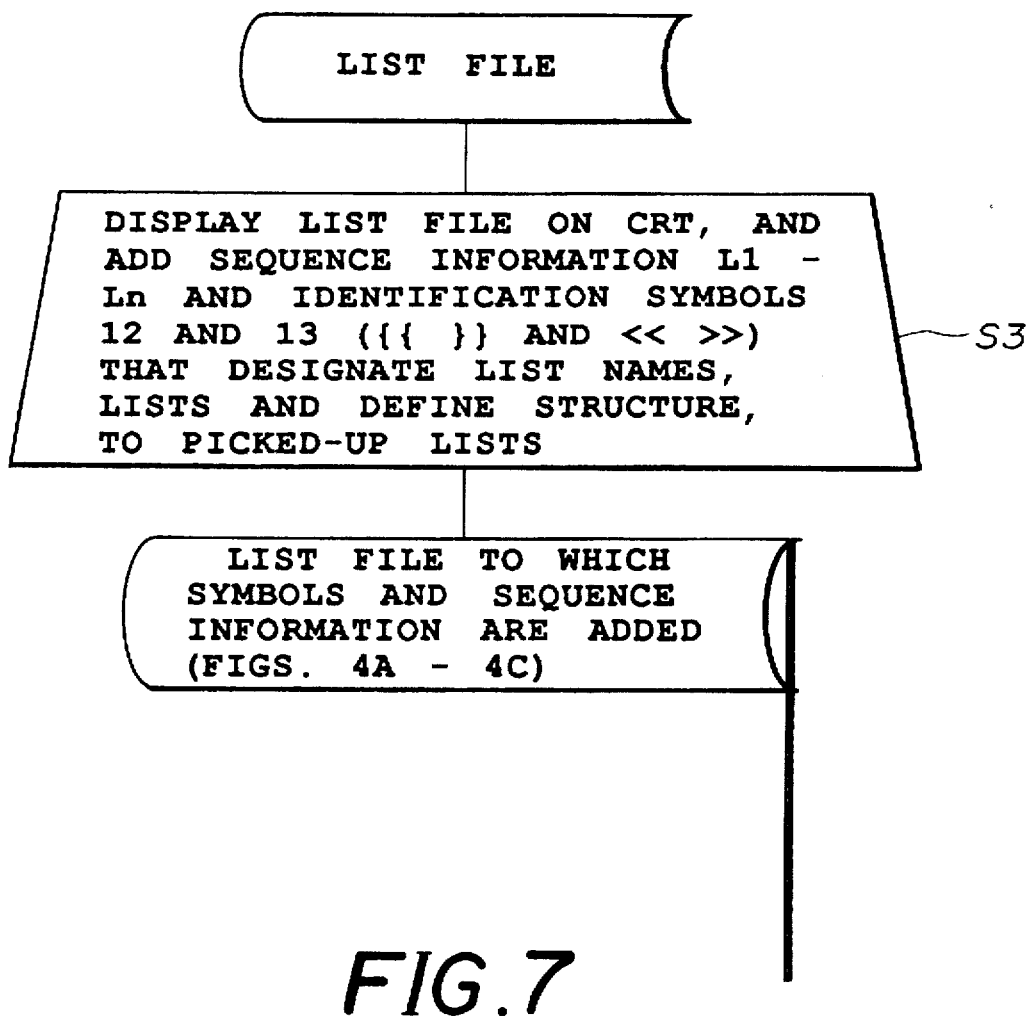
FIG. 7 is a flowchart showing addition of sequence information and identification symbols that represent the list structures and links between the Lists.

FIG. 7 is a flowchart for explaining the function for adding information on list structure and information necessary to form a link structure between the Lists and the external parameters.

At step S3, the picked up Lists are displayed on the CRT image unit 8. Subsequently, as shown in FIGS. 4A–4C, the operator designates list names and their conditional columns and rows by the identification symbols 12 ({{ }}), and variables, whose values are specified by the external parameters, by the identification symbols 13 (<< >>). For example, the list names such as "List 0", "List 1" are marked by the identification symbols 12 as shown in FIGS. 4A and 4B. The blocks that are marked are highlighted to confirm them. The conditional columns and rows are designated by attaching the identification symbols 12 to their top left corners and bottom right corners. The designated blocks are highlighted. Furthermore, the variables (operands) in the operations whose values are specified by the external parameters are marked by the identification symbols 13. The marked variables are highlighted. In this way, the list names, the conditional columns and rows, and the variables whose values are specified by the external parameters are designated by the identification symbols, and are sequentially highlighted. Thus, the operations are designated by designating conditional items and the like in the conditional columns and rows by using the list name, the conditional columns and rows, and the external parameters.

After that, as shown in FIGS. 4A–4B, the sequence information L1, L2, L3, . . . is added to the highlighted blocks so that the variables whose values are specified by the external parameters are associated with the external parameters. For example, sequential information L1 and L1-1 is added to the conditional columns of List 0, and L2 is added to the conditional row. Moreover, the sequence information L3 is added to the operand "basic pension" which is in the operations and directly designated by an external parameter. In addition, the sequence information L6 is added to the operand "List 1", and L7 to the operand "List 2". The sequence information L6 and L7 is added to the conditional columns of Lists 1 and 2 so that the operands in the operations are associated with the Lists.

Thus, by executing the above-described operation for all the Lists picked up, a new list file is prepared, in which the identification symbols 12 and 13, and the sequence information L1, L1-1, . . . are added to the preceding list file.

Figure 8A:
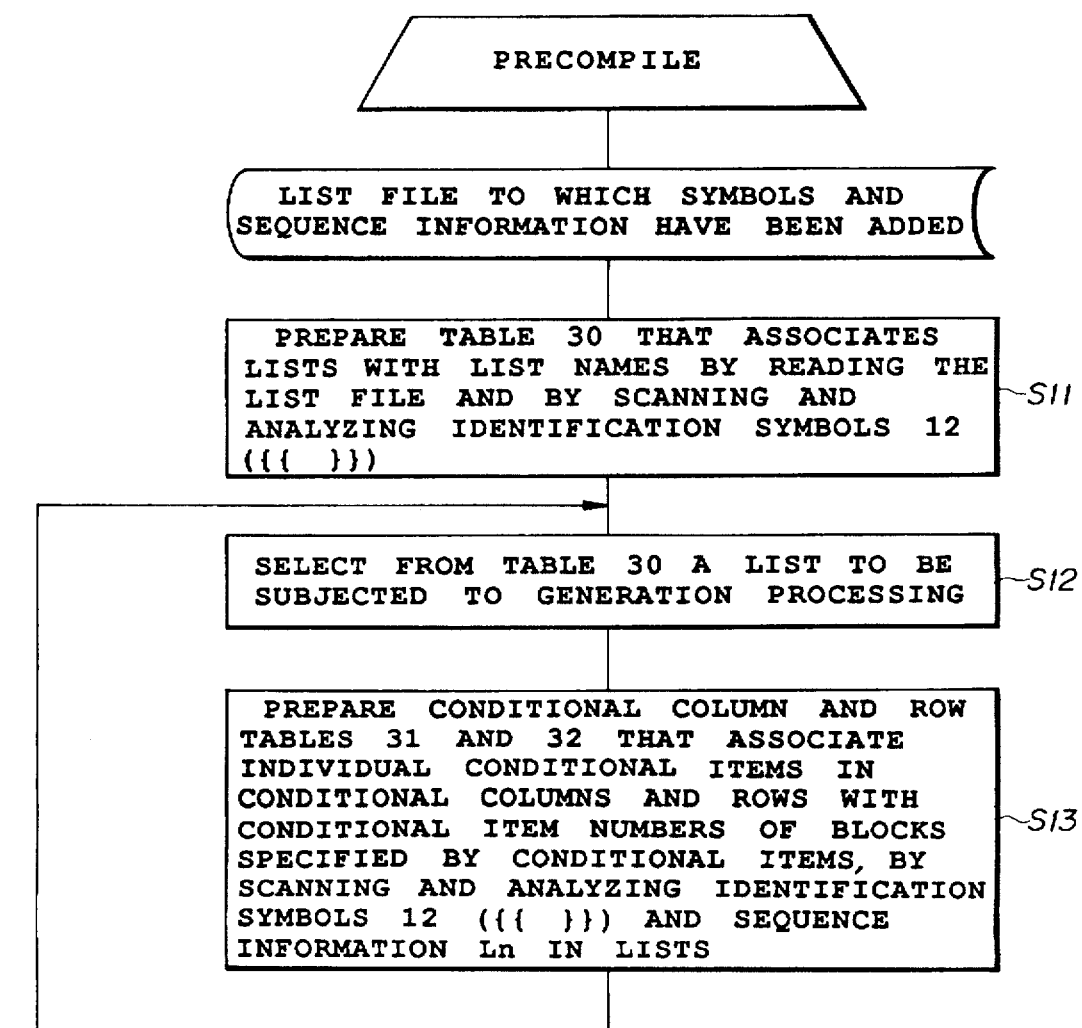
FIGS. 8A and 8B are flowcharts showing a procedure for generating a program.
Figure 8B:
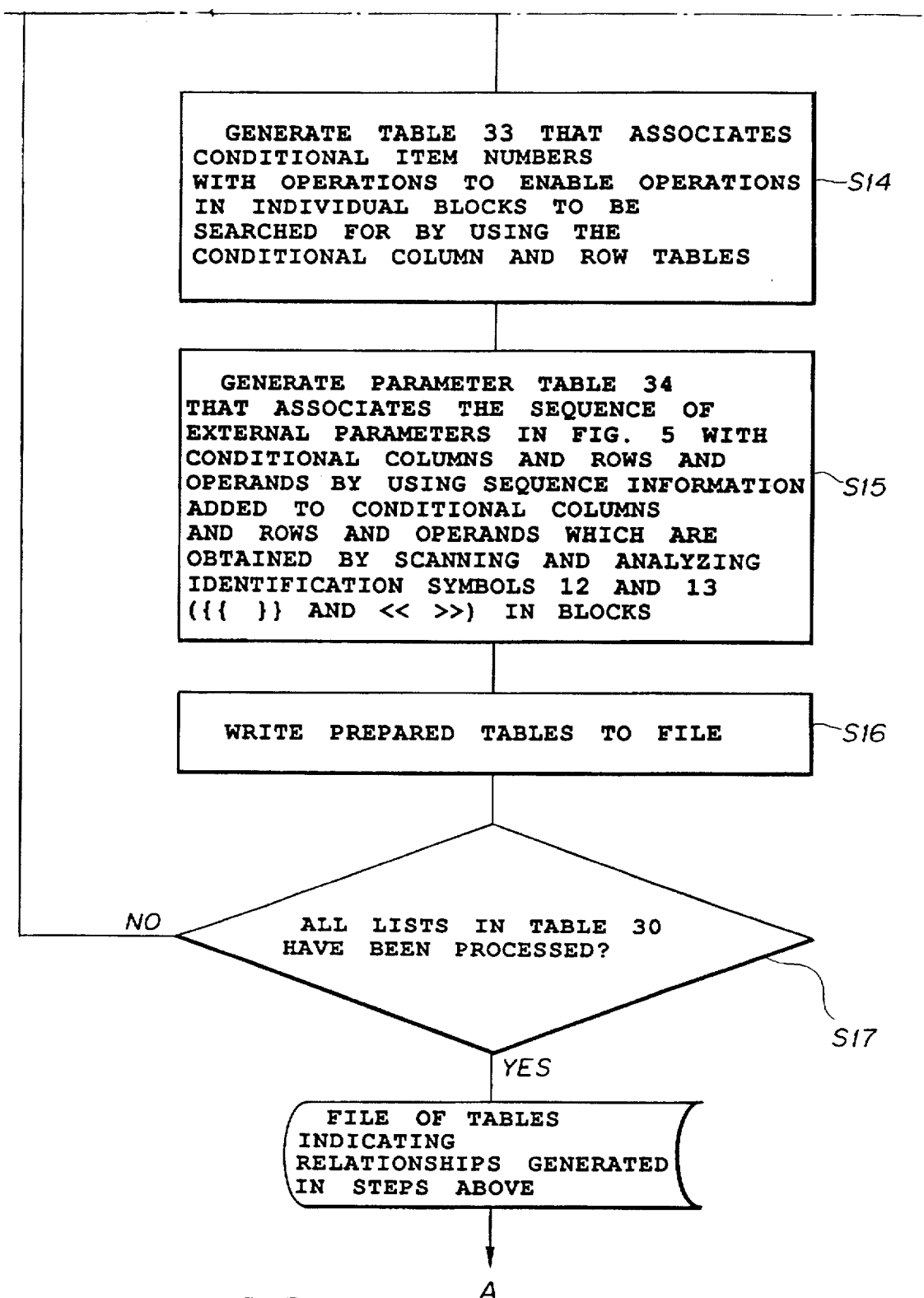

Subsequently, a part of a precompiling processing, that is, an information analysis processing is executed following the flowcharts of FIGS. 8A and 8B in order to generate a desired program module. By this, Tables are generated which include, in arranged forms, the logic defined by the information added to the Lists as shown in FIGS. 4A–4C.

At step S11, a Table 30 that associates the list names with the Lists as shown in FIG. 10 is prepared by scanning and analyzing the identification symbols 12 indicating the list names after reading into the memory 2 the list file to which the identification symbols 12 and 13 are added. More specifically, a Table, which contains, for each List, the list name and the pointer indicating the location at which the List is stored, is prepared so that the list management and search are carried out by this Table.

At step S12, one of the Lists, which define operations, that is, List 0 is selected.

At step S13, by scanning and analyzing the identification symbols 12 indicating the conditional columns and rows, and the sequence information L1–Ln, individual conditional items in the conditional columns and rows are picked up, thereby preparing Tables 31 and 32 as shown in FIGS. 11 and 12.

First, the conditional columns of List 0 as shown in FIG. 4A have a tree structure of two levels. The two levels correspond to the two external parameters P1 and P1-1, and are designated by the sequence information L1 and L1-1. The conditional columns are divided into individual lines. In the first line, P1 is a "pension", and P1-1 is blank. The second line is divided into two cases: P1 is a "lump sum at survivor's resignation" and P1-1 is a blank; or P1 is a "lump sum at resignation" and P1-1 is a blank. These processings are executed for individual lines, and conditional item numbers (i=1, 2, 3, . . . ) are added in accordance with respective lines, thereby forming Table 31. On the other hand, the conditional row is designated by a single piece of sequence information L2, which is associated with the external parameter P2. The conditional row is divided into a first section of "first additional pension" and a second section of "second additional pension", to which the conditional item numbers (j=1 and 2) are added, thereby forming Table 32.

At step S14, Table 33, which lists the operations designated by the column conditional item numbers i and the row conditional item numbers j, is prepared as shown in FIG. 13. In other words, Table 33 is prepared by sequentially storing operations determined by respective conditional item number pairs (i, j).

At step S15, the identification symbols 12 and 13, the conditional columns and rows, and sequence information L1–Ln which is added to the operands are scanned and searched. By using the sequence information, Table 34 is prepared as shown in FIG. 14. Table 34 associates the conditional columns and row and operands determined by the external parameters as shown in FIG. 4A, with the names of the Lists in which they are present, and with the names and sequences of the external parameters as shown in FIG. 5. At step S16, Tables 30–34, which are thus prepared, are stored into a disk in the disk drive 6. These step S12–S16 are repeated, which makes it possible to associate the conditional items and operands with the external parameters.

At step S17, it is tested for all the Lists named in Table 30 whether all the processings from step S12 to S16 have been completed. If they have not yet been completed, the processings from step S12 to S16 are repeated.

For example, the following processing is carried out with respect to List 1.

At step S12, List 1 is selected.

At step S13, Table 35 as shown in FIG. 15 is prepared. Table 35 corresponds to Table 31 of FIG. 11 prepared with respect to List 0. However, List 1 of FIG. 4B has only a conditional column of one level to which the sequence information L6 is attached. The conditional column is divided into individual lines. The first line is "20 years", the second line is "21 years", etc., to which the conditional item numbers (i=1, 2, 3, . . . ) are added. Thus, Table 35 of FIG. 15 is prepared. Since List 1 includes no conditional row, the conditional column and row table is Table 35 only. The sequence information L6 is associated with the external parameter P6.

At step S14, Table 36, which lists the operations defined by the column conditional item numbers i, is prepared as shown in FIG. 16. In other words, Table 36 is prepared which stores, for the respective conditional item numbers, the operations (which are values representing premium rates) that are determined in accordance with the conditional item numbers.

At step S15, scanning and searching of List 1 is carried out as that of List 0 so that the correspondence between the external parameter P6 and the conditional column and the list name of the List including them are added to External Parameter Table 34 of FIG. 14.

At step S16, Tables 35 and 36 prepared as described above, and Table 34 to which new information is added are stored on a disk in the disk drive unit 6.

At step S17, it is tested for all the Lists named in Table 30 whether the processings at steps S12–S16 have been completed or not, and the processings from step S12 to S16 are repeated until processings have been completed for all the Lists.

Figure 9:
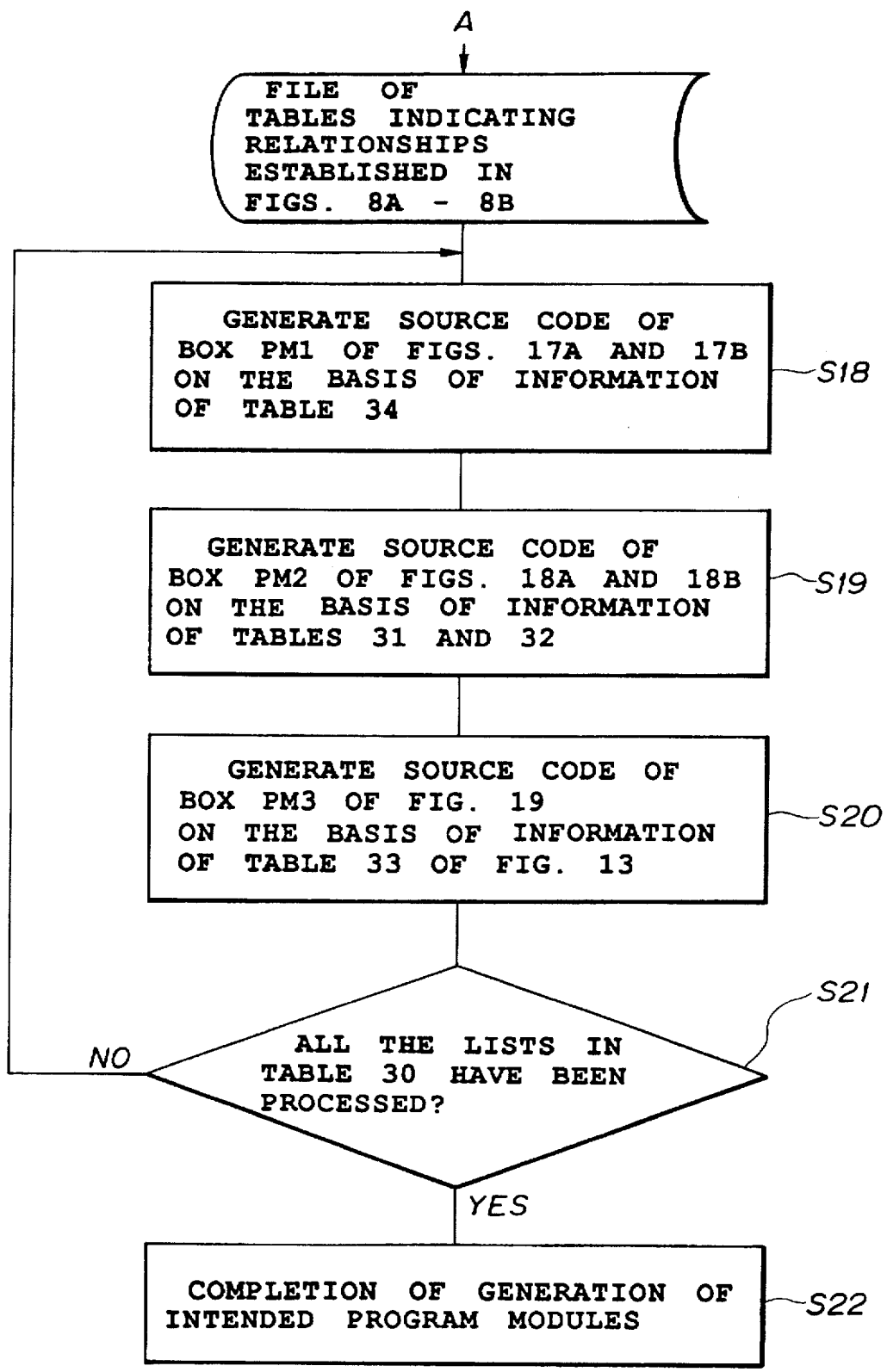
FIG. 9 is a flowchart showing a procedure for generating the program.

After all the Lists have been completed in this way, source codes of a program associated with List 0 is automatically generated in accordance with the flowchart as shown in FIG. 9. Since this program is used as a subroutine called from an external program (main program), the program is referred to as a subprogram. Before describing the method for generating the subprogram, let us explain a way how the automatically generated subprogram is executed. This will be helpful to understand the structure of the subprogram in advance. It is supposed here that the subprogram associated with List 0 has been automatically generated as shown in FIGS. 17A–19, and the way the subprogram is carried out will be described when the external parameters as shown in FIG. 5 are given.

The external parameter P1 provided for the subprogram corresponding to List 0 is "selected lump sum", and P1-1 is "at retirement". In the box PM2 of FIGS. 18A and 18B, Table 31 is searched using these external parameters as a key, and the conditional item number i=4 is obtained. On the other hand, since the external parameter P2 is "the first additional pension", the conditional item number j=1 is obtained by searching Table 32 using the parameter value as a key. Thus, the control is transferred to the operation whose statement label is 41 in the box PM3. This operation is expressed as follows as shown in FIG. 19:

$$\text{resultant value} = P3 \times \text{funcList 1 } (P6) \times \quad (1)$$

$$\text{funcList 2 } (P7) \times \text{funcList 3 } (P8) \times \text{funcList 6 } (P12)$$

Its actual calculation is executed as follows: The external parameter P3 is a "basic pension", whose value is "200,000" as shown in FIG. 5. The term funcList 1 (P6) corresponds to execute the subprogram of List 1 as shown in FIGS. 20A–22. The external parameter P6 is a "length of service" and its value is "22 years". In the box PM5 in FIGS. 21A and 21B, Table 35 is searched using "22 years" as a key, and the conditional item number i=3 is obtained. Hence, the processing moves to the operation of statement label 3 stated in the box PM6 of FIG. 22. In this case, the resultant value =0.364 is obtained, and funcList 1 (P6) becomes 0.364.

Similarly, subprograms corresponding to the terms funcList 2 (P7), funcList 3 (P8), and funcList 6 (P12) are executed using these external parameters. By using resultant values of these calculations, the resultant value of equation (1) is obtained. This is the result of the operation of List 0 when the external parameters as shown in FIG. 5 are given.

As mentioned above, FIGS. 17A–19 show the subprogram of List 0, and FIGS. 20A–22 show the subprogram of List 1. These subprograms each comprise a subprogram linkage portion, a procedure portion 1, and procedure portion 2.

The linkage portion PM1 (or PM4) declares an interface with a main program for delivering the external parameters to the subprogram. It declares the following:

(1) A subprogram name.
(2) The sequence, the number and data attributes of the external parameters associated with conditional items, those of the external parameters specifying the values of variables, and those of the external parameters (output items) for outputting the resultant values obtained by the processing of the subprogram.

The procedure portion 1, PM2 (or PM5) determines the operation processing designated by the external parameters. More specifically, Conditional Item Tables 31 and 32 are searched using the external parameters, which designate the conditional items, as a key, so that the conditional item numbers designating the operation specified are obtained, and the control is moved to the corresponding portion in the procedure portion 2.

The procedure portion 2, PM3 (or PM6) is an operation processing portion that executes individual operations.

Next, a method for automatically generating the subprograms is described.

The subprogram associated with List 0 as shown in FIGS. 17A–19 is generated on the basis of a model program shown in the right hand side of these figures. In the model program, %xxx indicates portions which are replaced with the information of the Internal Tables. For example, 77 %p1 PIC %type stated in the linkage portion PM1A of the model program is replaced with

77 P1 PIC1 X(30)

in the subprogram PM1. This substitution is performed on the external parameters of the Internal Table 34 and the operands which are dealt with as variables. Here, 77 is a label number, which means that the data has no multilevel structure, and X(30) defines that the variable P1 is a character variable of 30 bytes (1 byte=8 bits). The information X(30) is obtained by referring to a dictionary which is prepared separately, and defines the attribute of the variable P1. Likewise,

77 P3 PIC 9(18)

defines that the variable P3 is a numeral of 18 digits (1 digit=4 bits).

The procedure portion PM2 is generated on the basis of the model program PM2A, and comprises a routine for searching Internal Table 31 using the external parameters P1 and P1-1 as a key, and a routine for searching Internal Table 32 using the external parameter P2 as a key. To generate such routines, the model program is prepared anticipating that the conditional columns and rows can have a multilevel structure (tree structure). More specifically, when the conditional columns take a tree structure as in List 0, the conditional items exclusively selected from individual levels (which correspond to the external parameters P1 and P1-1) are ANDed to form a conditional item set, and Internal Table 31 is searched using the conditional item set as a key. Thus, the model program has been made in such a manner that the conditional item number pair (i, j) corresponding to the conditional set specified by the external parameters P1 and P1-1 (in this example, they are the "selected lump sum" and "at retirement") is determined. Likewise, the routine for searching Internal Table 32 associated with the conditional row is generated. Since the conditional row is a single level, the conditional items are not ANDed.

The procedure portion PM3 comprises source codes formed by developing the operations specified by the conditional item number pair (i, j). A method for development is known in the art.

FIG. 9 is a flowchart showing a method for generating the source codes. At step S18 of FIG. 9, the source codes in the box PM1 of FIGS. 17A and 17B are generated on the basis of the External Parameter Table 34. More specifically, the external parameters in List 0 and the associated lists are picked up from External Parameter Table 34, and source codes for interfacing this subprogram with a main program that delivers these parameters thereto, and source codes associated with variations used in the operations are automatically generated.

At step S19, the source codes in the box PM2 of FIGS. 18A and 18B are generated on the basis of the information in Conditional Item Tables 31 and 32 associated with List 0. The source codes include ones for transferring the control to the operation specified by the conditional item number pair (i, j).

At step S20, the source codes in the box PM3 of FIG. 19 are generated on the basis of the information in Table 33. More specifically, the source codes for executing the operations specified by the conditional item number pairs (i, j) are generated, and statement labels ij are attached thereto. In this case, when the operation includes a list name as an operand like the operation 21 of FIG. 4A, source codes for calling the subprogram of that list name are generated. Such generation is performed on all the contents of Table 33. Thus, the subprogram of List 0 is generated.

At step S21, it is tested whether or not the processings of steps S18–S20 have been completed for all the Lists named in Table 30.

Next, generation of source codes of a subprogram of List 1 will be described with reference to FIGS. 20A–22. This subprogram is generated in a manner similar to that described above.

At step S18 of FIG. 9, the box PM4 of FIGS. 20A and 20B is generated on the basis of External Parameter Table 34. More specifically, the external parameters associated with List 1 are picked up from External Parameter Table 34, and source codes for interfacing this subprogram with a main program that delivers these parameters thereto are automatically generated.

At step S19, the source codes in the box PM5 of FIGS. 21A and 21B are generated on the basis of the information in Conditional Column Table 35 associated with List 1. More specifically, the source codes for obtaining a corresponding conditional item number i by searching Table 35 using the external parameter P6 delivered thereto as a key are generated. In addition, are generated the source codes for transferring control to the corresponding statement of the procedure portion 2, in which the operations specified by the conditional item number i are described.

At step S20, the source codes in the box PM6 of FIG. 22 are generated on the basis of the information in Table 36. More specifically, the source codes for executing the operations specified by the conditional item numbers i are generated, and statement labels i are attached thereto. Such generation is performed on all the contents of Table 36.

At step S21, it is tested whether or not the processings of steps S18–S20 have been completed for all the Lists named in Table 30. Thus, all the subprograms associated with List 0 are generated.

Figure 23:
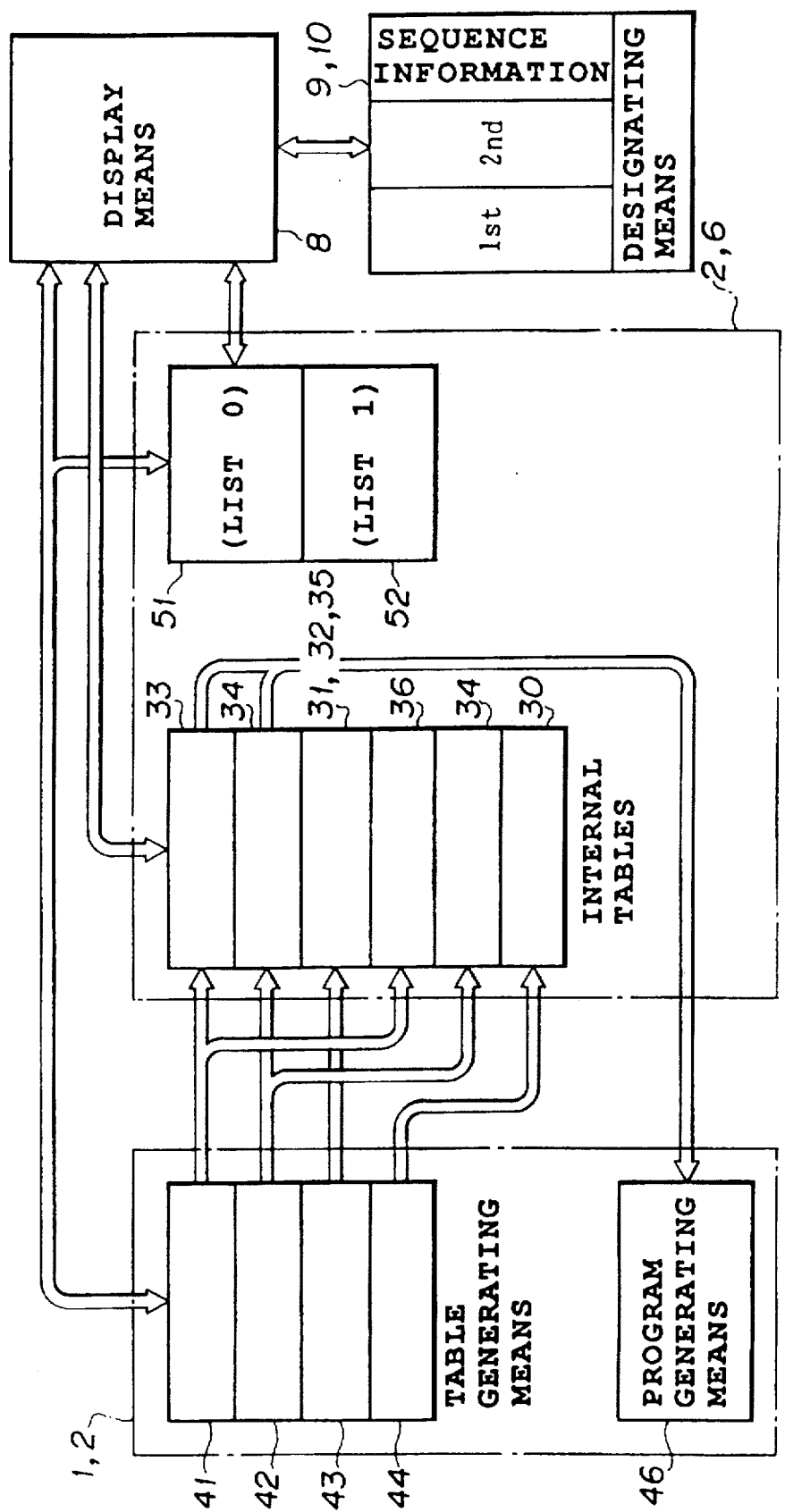
FIG. 23 is a functional block diagram showing an arrangement of the present invention.

FIG. 23 is a functional block diagram of the present embodiment, which shows the Tables 31–36 being variously generated by table generating means 41–44. The source codes are generated by a program generating means 46.

These table generating means 41–46 comprises programs stored on the memory 2, and the microprocessor 1 that executes the programs. In addition, there are provided, on the memory 2 and a disk in the disk drive 6, areas for storing Internal Tables 30–36. List 0 designated by the reference numeral 51, List 1 designated by the reference numeral 52 and the like. These Lists can be displayed on the display means (CRT image unit) 8. The display unit 8 also displays information inputted from a designating means such as the keyboard 9 and the mouse 10. Thus, the identification symbols 11, 12, and 13, sequence information Ln, and the like are inputted to a desired location on the displayed image. The designating means constitutes first and second designating means, and sequence information designating means.

VARIATION 1

In the embodiment described above, the Lists, list names, conditional columns and rows, and variables are designated by identification symbols inputted from the keyboard 9. Using visible identification symbols, however, are not essential. For example, areas of the Lists, list names, conditional columns and rows, and variables may be designated by a coordinate input means such as the mouse 10, and the information on these areas may be inputted by selecting menus or using the keyboard 9, thereby providing information equal to the identification symbols. Although the two methods are different in operation, they can provide logically identical information.

VARIATION 2

In the embodiment described above, it is a principle that a single operation is specified by a pair of column and row conditional items, and the result of the operation is produced as one output item. However, it is possible to construct a structure that produces a plurality of output items for a single conditional item.

FIG. 24 is a List illustrating such an example. This List 101 comprises a conditional column referred to as score range, and a conditional row consisting of three subjects of Japanese, mathematics, and English. Each block designated by a score range and a subject name contains the number of persons satisfying the condition.

The processing of List 101 is carried out as follows: First, a user attaches the identification symbol 12 to the conditional column whose name is score range by a manual input using the keyboard 9 or the mouse 10. Likewise, he attaches the identification symbol 13 to the conditional column name "score range". As described before, the identification symbol 12 is a symbol for designating the conditional column or row, and the identification symbol 13 is a symbol attached to a variable whose value is specified by an external parameter. Furthermore, the sequence information L1, which indicates the sequence corresponding to the external parameters, is attached to the "score range", which is the name of the conditional column. Moreover, the identification symbols 13 and the sequence information L2–L4 are fixed to individual subjects of Japanese, mathematics and English in order to indicate that they are items associated with the second to fourth external parameters. The identification symbols and sequence information are inputted as in the first embodiment. The external parameters are designated as associated with either the conditional column or the output item names, by selecting displayed menus.

With such an arrangement, providing only a conditional value of the score range by the external parameter makes it possible to output the numbers of persons in that range in terms of Japanese, mathematics and English. In other words, designating a single conditional item by the external parameter produces a plurality of outputs. In this case, the external parameters associated with the sequence information L2, L3 and L4 are used as the output items so that the numbers of persons of the designated score range are outputted in terms of these external parameters as a result.

VARIABLE 3

FIG. 25 shows another example, in which the conditional columns and row include a tree structure. In this List 102, the conditional columns include a tree structure having two levels of sex and score range. The conditional row, on the other hand, has a single level structure consisting of three conditional items of Japanese, mathematics and English. A user provides individual levels of the conditional columns and row with the identification symbols 12 by manual inputs using the input means so that the levels can be distinguished. In addition, the sex, score range, and subject are designated as three variables to which the sequence information L1–L3 is attached, thereby establishing the association with the external parameters. In addition, the identification symbol 13 and the sequence information L4 are added to the output items (the number of persons) in order to establish association with the external parameter.

The analysis of the conditional items of the tree structure are already described in the first embodiment. Using the tree structure makes it possible to express complicated conditions.

Although the subject names (Japanese, mathematics and English) are designated as the output items in the variation 1, and as the conditional items in the variation 2, the designation methods can be selected by the user in accordance with the structure of the List.

VARIABLE 4

FIG. 26 shows an example, in which the values of conditional items (conditional values) include variables. List 103 comprises one level conditional column describing decision conditions, and output items associated thereto. Each conditional item of the column includes variables X and Y. List 103 is displayed on the display unit, and the name of the conditional column (decision conditions), variables X and Y, and the name of the output items (decision results) are designated by the identification symbols 13 manually inputted using the input means, and are provided with the sequence information L1–L4. Thus, the variables are associated with the external parameters. Therefore, the values of respective conditional items are calculated by designating the values of the variables X and Y by the external parameters. In addition, the resultant value is tested whether it is suitable or unsuitable, and the test result is outputted as the fourth external parameter.

SECOND EMBODIMENT

In the first embodiment described above, the source codes are generated based on Internal Tables. To generate source codes, however, is not essential. For example, an intermediate language table may be generated from Internal Tables so that the designated operations are carried out with reference to Internal Tables and an Intermediate Language Tables.

FIG. 27 shows an illustrative example of the processing in accordance with the second embodiment. In this figure, Table 73 is formed by adding position information 71 to Table 33 described before. More specifically, it is formed by adding the address information in Intermediate Language Table 75 to Table 33 which indicates the association between the conditional items of List 0 and the operations therein.

Intermediate Language Table 75, which includes all the operations in Table 33 in expanded forms, is automatically generated. For example, the top operation of Table 33, which is expressed as basic pension×List 1×List 2×List 3, is expanded from address 1 to 6 in Intermediate Language Table 75. More specifically, the first operation items 78 of the addresses 1, 2, 3 and 4 sequentially list the second and the following operands of the top operation. In addition, the second operation items 80 of the addresses 4, 5 and 6 designate the resultant block 77 of the addresses 1, 2 and 3. Operators 79 of the addresses 4, 5 and 6 are filled with the multiplication sign ×. Furthermore, the first operation items 78 of the addresses 5 and 6 designate the resultant blocks 77 of the addresses 4 and 5, and the resultant block of the address 6 indicates an area into which the pension obtained by the operation is to be written. Thus, the basic pension is sequentially multiplied by values selected from Lists 1–3 in accordance with the contents of the addresses 1–6 of Intermediate Language Table 75, thereby giving the resultant pension. Here, the Intermediate Language Table 75 comprises a type column 76 and the resultant blocks 77 in addition to the first and second operation items 78 and 80, and the operators 79. The type column 76 includes two digit numbers whose unit digit indicates the location to which the operation result is placed, and has the following meanings:

1=substitute the operation result into a resultant block 77;

2=substitute the operation result into the external parameter indicated in a resultant block 77.

The tenth digit, on the other hand, indicates the operation type having the following meanings:

1=substitution of a character constant=substitute a character constant in the first operation items into the location indicated by the resultant block 77;

2=substitution of a numerical constant=substitute numerical constant in the first operation items into the location indicated by the resultant block 77;

3=numerical operation=perform binomial operation, and substitute its result into the location indicated by resultant block 77; and 4=execution of other list=perform the operation associated with the list name indicated by the first operation items 1, and substitute the resultant value into the location indicated by the substitution destination of the operation result.

FIG. 28 is a block diagram showing a system for carrying out the direct execution type process.

In this figure, a table processor interpreter 91 comprises a session opening portion 93, a list calculation executing portion 95, and a session closing portion 97. The functions of the session opening portion 93 are as follows: The numerals attached to the following individual items correspond to the parenthetic numerals in FIG. 28.

(1) The session opening portion 93 is called by an user and opens the lists associated with list names given as parameters at the calling, and the following processings are started. In this embodiment, the list names of the Lists to be opened are Lists 0–9.

(2) The designated Lists are read, and the contents thereof are analyzed, so that Internal Tables 30–36 are generated in a method similar to that of the first embodiment.

(3) Intermediate Language Table 75 is generated on the basis of Internal Tables. Intermediate Language Table covers all the Lists named in List Name versus List Storing Position Table 30. For example, with regard to List 0, all the contents of the operation listed in Table 33, which represents the associations between the conditional items and operations, are expanded in order to generate the above described Intermediate Language Table 75. After that, the address information (position information) 71 of Intermediate Language Table 75 is added to Table 33 to complete Table 73.

(4) After completing the processing of (3), the control is returned to the calling program.

Functions of the list calculation executing portion 95 are as follows:

(5) The list calculation executing portion 95 is called by the user, and starts the following processings on the basis of the list names and the values of the external parameters provided as parameters at the calling.

(6) The operations are executed referring to the input values of the external parameters, Internal Tables 30–36, and Intermediate Language Tables 75. More specifically, (a) the operation is determined by the conditional items specified in accordance with the input values of the external parameters; and (b) the operation is executed by picking up the intermediate language of the operation to obtain a resultant value. In this case, when the operation includes a term which refers to another List, the above mentioned (a) and (b) are executed with regard to that List in order to obtain a resultant value of that List.

(7) After completing the calculation processing of the designated operation, the control is returned to the calling program with the resultant external parameter name and the resultant value.

Functions of the session closing portion 97 are as follows:

(8) The following processings are performed on the Lists which are called by the user and have the list names given by the parameters at the calling.

(9) Lists designated, Internal Tables associated therewith, and Intermediate Language Table are released, and the control is returned. Here, the release of Internal Tables and Intermediate Language Table means the closing of the files and the release of the memory area.

Although the session opening portion 93, the list calculation executing portion 95, and the session closing portion 97 are separately designated by the user in this embodiment, the designation is not restricted to this. For example, it is possible for the session opening portion 93, the list calculation executing portion 95, and the session closing portion 97 to be sequentially executed, once the table processor interpreter has been designated.

INDUSTRIAL APPLICABILITY

The present invention can be applied to lists in working regulations specifying working contents, and system specifications describing systems. In addition, it can be applied to other diverse operation processings such as premium rate calculations, allotment calculations, program control structures, etc.

While the present invention has been described in detail with respect to preferred embodiments, it will be understood that numerous modifications, changes, variations and equivalents will be made by those skilled in the art without departing from the spirit and scope of the invention. Accordingly, it is intended that the invention herein be limited only by the scope of the appended claims.

What is claimed is:

1. An information processing system comprising:

display means for displaying a first list in the form of a document including a plurality of conditional items which show contents of if-parts of if-then statements and operations which show contents of then-parts of the if-then statements;

first pointing means for pointing the conditional items and the operations in the displayed first list;

second pointing means for pointing variables in the conditional items and operations in the displayed first list, said variables being specified by external parameters in the first list;

first table generating means for generating a first table indicating relationships between the pointed conditional items and each of the pointed operations;

second table generating means for generating a second table indicating relationships between the pointed variables in the first list and the external parameters; and program generating means for converting into source codes of the if-then statements, appropriate for execution by computer, the operations specified by the pointed conditional items that are sequentially picked from the first table, using said second table.

2. The information processing system as claimed in claim 1, wherein said first pointing means divides at least some of the conditional items into blocks, each of the blocks being associated with a different level of a tree structure, said information processing system further comprises third table generating means for generating a third table indicating conditional item sets formed by combining conditional items selected from the blocks, and said first table generating means registers the operations associated with said conditional item sets in the first table.

3. The information processing system as claimed in claim 1, further comprising sequence information designating means for designating, in the displayed first list, sequence information that indicates a sequence of parameter values specified by the external parameters for the pointed conditional items and variables.

4. The information processing system as claimed in claim 1, wherein at least one of said conditional items specifies a plurality of said operations, and results produced by execution of the plurality of operations are associated with the external parameters.

5. The information processing system as claimed in claim 1, wherein said first pointing means includes coordinate input means for addressing block locations of the pointed conditional items in said first list, and said second pointing means includes coordinate input means for addressing block locations of the pointed variables in the first list.

6. The information processing system as claimed in claim 1, wherein the display means displays a second list related to the first list, and wherein said first pointing means points conditional items and the operations in the displayed second list, said second pointing means points variables in conditional items and operations in the displayed second list, said variables being specified by the external parameters in the second list, said first table generating means further generates a third table indicating relationships between the pointed conditional items and each of the pointed operations in the second list, said second table generating means generates a fourth table indicating relationships between the pointed variables in the second list and the external parameters, said information processing system further comprising a third pointing means for pointing the first and second lists and their list names, and a third table generating means for generating a fifth table indicating relationships between the list names and address locations where the first and second lists are stored in a memory, at least one of said operations indicated in the first list including a name of the second list as one of the variables, and the conditional items in the second list being specified by values of the external parameters.

7. The information processing system as claimed in claim 6, wherein said first designating means divides at least some of the conditional items into blocks, each of the blocks being associated with a different level of a tree structure, said information processing system further comprises fourth table generating means for generating a sixth table indicating conditional item sets formed by combining conditional items selected from each one of the blocks, and said first table generating means registers the operations associated with said conditional items sets in the first table.

8. The information processing system as claimed in claim 2, wherein said program generating means generates a first source code for searching the third table for the operations designated by the external parameters and a second source code for linking the first source code to a main program on the basis of the external parameters using the second table.

9. An information processing system comprising:

display means for displaying a first list in the form of a document including a plurality of conditional items which shows contents of if-parts of if-then statements and operations, which show contents of then-parts of if-then statements;

first pointing means for pointing the conditional items and the operations in the displayed first list;

second pointing means for pointing the variables in the conditional items and in the operations in the displayed first list;

means for inputting external parameters for specifying values of the variables in the conditional items and in the operations in the displayed first list;

means for generating a first table indicating relationships between the pointed conditional items and each of the pointed operations;

means for generating a second table indicating relationships between the pointed variables in the first list and the external parameters; and executing means for executing the operations specified by the pointed conditional items that are specified by external parameters, using the first table and the second table.

10. The information processing system as claimed in claim 9, wherein said executing means executes the selected operations after expanding the selected operations into an intermediate language table.

11. The information processing system as claimed in claim 9, wherein said first pointing means divides at least some of the conditional items into blocks, each of the blocks being associated with a different level of a tree structure, said information processing system further comprises means for generating a third table indicating conditional item sets formed by combining conditional items selected from the blocks, and said first table generating means registers the operations associated with said conditional item sets in the first table.

12. The information processing system as claimed in claim 11, further comprising searching means for searching the conditional item sets in the third table using the external parameters as a key to select the operations associated with said conditional item sets specified by the external parameters.

13. The information processing system as claimed in claim 9, further comprising sequence information designating means for designating, in the displayed first list, sequence information that indicates a sequence of parameter values specified by the external parameters for the pointed conditional items and variables.

14. The information processing system as claimed in claim 9, wherein at least one of said conditional items specifies a plurality of said operations, and the results produced by execution of the plurality of operations are associated with the external parameters.

15. The information processing system as claimed in claim 9, wherein said first pointing means includes coordinate input means for addressing block locations of the designated conditional items in said displayed first list, and said second pointing means includes coordinate input means for addressing block locations of the designated variables in said displayed first list.

16. The information processing system as claimed in claim 9, wherein the display means displays a second list related to the first list, and wherein said first pointing means points conditional items and the operations in the displayed second list, said second pointing means points variables in conditional items and operations in the displayed second list, said variables being specified by the external parameters in the second list, said first table generating means further generates a third table indicating relationships between the pointed conditional items and each of the pointed operations in the second list, said second table generating means generates a fourth table indicating relationships between the pointed variables in the second list and the external parameters, said information processing means further comprising a third pointing means for pointing the first and second lists and their list names, and a third table generating means for generating a fifth table indicating relationships between the list names and address locations where the first and second lists are stored in a memory, at least one of said operations indicated in the first list including a name of the second list as one of the variables, and the conditional items in the second list being specified by values of the external parameters.

17. The information processing system as claimed in claim 16, wherein said first pointing means divides at least some of the conditional items into blocks, each of the blocks being associated with a different level of a tree structure, said information processing system further comprises fourth table generating means for generating a sixth table indicating conditional item sets formed by combining conditional items selected from the blocks, and said first table generating means registers the operations associated with said conditional item sets in the first table.

18. The information processing system as claimed in claim 11, wherein said executing means searches the third table to select the operations pointed by the external parameters, executes and links said pointed operation to a main program on the basis of the external parameters using the second table.

19. An information processing method comprising the steps of:
displaying a first list in the form of a document including a plurality of conditional items which shows contents of if-parts of if-then statements and operations which show contents of then-parts of the if-then statements;
pointing the conditional items and the operations in the displayed first list on the basis of instructions;
pointing variables in the conditional items and operations in the displayed first list on the basis of the instructions, said variables being specified by external parameters in the displayed first list;
generating a first table indicating relationships between the pointed conditional items and each of the pointed operations;
generating a second table indicating relationships between the pointed variables in the displayed first list and the external parameters; and
converting into source code of the if-then statements, appropriate for execution by computer, the operations specified by the pointed conditional items that are sequentially picked from the first table, using said second table.

20. The information processing method as claimed in claim 19, wherein the conditional items include column conditional items and row conditional items, and the operations are specified by selectively combining the column conditional items and the row conditional items.

21. The information processing method as claimed in claim 19, further comprising the step of dividing at least some of the conditional items into blocks, each of the blocks being associated with a different level of a tree structure; and the step of generating a third table indicating conditional item sets formed by combining conditional items selected from the blocks, and the step of registering the operations associated with said conditional item sets in the first table.

22. The information processing method as claimed in claim 19, further comprising the step of forming, in the displayed first list, sequence information indicating a sequence of parameter values specified by the external parameters for the pointed conditional items and variables.

23. The information processing method as claimed in claim 19, wherein at least one of said conditional items specifies a plurality of said operations, the method further includes the step of associating the results produced by execution of the plurality of operations with the external parameters.

24. The information processing method as claimed in claim 19, wherein the conditional items and the variables in said displayed first list are pointed using block pointing information of coordinate block addresses in the displayed first list.

25. The information processing method as claimed in claim 19, further comprising the steps of:
displaying a second list related to the first list;
pointing conditional items and the operations in the displayed second list on the basis of the instructions;
pointing variables in the pointed conditional items and operations in the displayed second list, the pointed variables having values specified by the external parameters in the second list on the basis of the instructions;
pointing the first and second lists and their list names on the basis of instructions;
generating a third table indicating relationships between the pointed conditional items and each of the pointed operations in the displayed second list;
generating a fourth table indicating relationships between the pointed variables in the second list and the external parameters; and
generating a fifth table indicating relationships between list names and locations where the first and second lists are stored in memory,
wherein at least one of the operations in the first list includes the displayed second list name as one of the variables, and the conditional items in the second list are specified by values of the external parameters.

26. The information processing method as claimed in claim 25, wherein at least some of the conditional items are divided into a plurality of blocks, and wherein said method further comprises the step of forming conditional item sets by combining conditional items selected from each one of the blocks, each of the blocks being associated with a different level of a tree structure; the step of indicating the conditional item sets in a sixth table; and the step of registering in the first table the operations specified by the conditional item sets.

27. The information processing method as claimed in claim 21, further comprising the step of generating a first source code for searching the third table for the operations pointed by the external parameters, and the step of generating a second source codes for linking the first source code to a main program on the basis of the external parameters using the second table.

28. An information processing method comprising the steps of:

displaying a first list in the form of a document including a plurality of conditional items which show contents of if-parts of if-then statements and operations which show contents of then-parts of the if-then statements;

pointing the conditional items and the operations in the displayed first list on the basis of instructions;

pointing the variables in the conditional items and the operations in the displayed first list on the basis of the instructions;

inputting external parameters for specifying values of the variables in the conditional items and operations in the displayed first list;

generating a first table indicating relationships between the pointed conditional items and each of the pointed operations;

generating a second table indicating relationships between the pointed variables in the displayed first list and the external parameters; and executing the operations specified by the first table and the pointed conditional items that are specified by the external parameters, using the second table.

29. The information processing method as claimed in claim 28, wherein said executing step executes the pointed operations after expansion into an intermediate language table.

30. The information processing method as claimed in claim 28, further comprising the step of dividing the conditional items in the first list into blocks, each of the blocks being associated with a different level of a tree structure; and the step of generating a third table indicating conditional item sets formed by combining conditional items selected from some of the blocks, and the step of registering the operations associated with said conditional item sets in the first table.

31. The information processing method as claimed in claim 30, further comprising the step of searching the conditional item sets in the third table using the external parameters as a key to select the operations associated with said conditional item sets specified by the external parameters.

32. The information processing method as claimed in claim 28, further comprising the step of forming sequence information, on the basis of instructions, in the displayed first list, the sequence information indicating a sequence of parameter values specified by the external parameters for the pointed conditional items and variables.

33. The information processing method as claimed in claim 28, wherein at least one of said conditional items specifies a plurality of said operations, and the results produced by execution of the plurality of operations are associated with the external parameters.

34. The information processing method as claimed in claim 28, wherein the conditional items and the variables in said first list are pointed using block pointing information of coordinate block addresses in the displayed first list.

35. The information processing method as claimed in claim 28, further comprising the steps of:

displaying a second list related to the first list;

pointing conditional items and the operation in the displayed second list on the basis of the instructions;

pointing variables in the conditional items and operations in the displayed second list, the pointed variables having values specified by the external parameters in the second list on the basis of the instructions;

pointing the first and second lists and their list names on the basis of instructions;

generating a third table indicating relationships between the pointed conditional items and each of the pointed operations in the displayed second list;

generating a fourth table indicating relationships between the pointed variables in the second list and the external parameters; and generating a fifth table indicating relationships between list names and locations where the first and second lists are stored in memory, wherein at least one of the operations in the displayed first list includes the displayed second list name as one of the variables, and the conditional items in the second list are specified by values of the external parameters.

36. The information processing method as claimed in claim 35, wherein at least some of the conditional items are divided into a plurality of blocks, said method further comprising the step of forming conditional item sets by combining conditional items selected from a plurality of the blocks, each of the blocks being associated with a different level of a tree structure; the step of indicating the conditional item sets in a sixth table; and the step of registering in the first table the operations specified by the conditional items sets.

37. The information processing method as claimed in claim 30, further comprising the step of searching the third table for the operations designated by the external parameters; and the step of executing and linking said designated operations to a main program on the basis of the external parameters using the second table.

38. A memory storing computer-executable program code, comprising:

means causing a computer to display a first list in the form of a document including a plurality of conditional items which show contents of if-parts of if-then statements and operations which show contents of then-parts of the if-then statements;

means causing the computer to point the conditional items and the operations in the displayed first list on the basis of instructions;

means causing the computer to point variables in the conditional items and operations in the displayed first list on the basis of the instructions, said variables being specified by external parameters in the displayed first list;

means causing the computer to generate a first table indicating relationships between the pointed conditional items and each of the pointed operations;

means causing the computer to generate a second table indicating relationships between the pointed variables in the displayed first list and the external parameters; and means causing the computer to convert into source code of the if-then statements the operations specified by the pointed conditional items that are sequentially picked from the first table, using said second table.

39. A memory storing computer-executable program code, comprising:

means causing a computer to display a first list in the form of a document including a plurality of conditional items which show contents of if-parts of if-then statements and operations which show contents of then-parts of the if-then statements;

means causing the computer to point conditional items and the operations in the displayed first list on the basis of instructions;

means causing the computer to point the variables in the conditional items and the operations in the displayed first list on the basis of the instructions;

means causing the computer to input external parameters for specifying values of the variables in the conditional items and operations in the displayed first list;

means causing the computer to generate a first table indicating relationships between the designated pointed conditional items and each of the pointed operations;

means causing the computer to generate a second table indicating relationships between the pointed variables in the displayed first list and the external parameters; and means causing the computer to execute the operations specified by the pointed conditional items that are specified by the external parameters, using the first and second tables.

40. An information processing system comprising:

display means for displaying a first list wherein a plurality of conditional items of selective choice constructs are described in a first area and a plurality of operations of said selective choice constructs are described in a second area;

first pointing means for pointing respectively said first area and said second area in said displayed first list;

second pointing means for pointing areas which exist in said first area and said second area in said displayed first list, wherein variables are described and values of said variables specified by external parameters are described;

first table generating means for generating a first table indicating relationships between said plurality of conditional items described in the pointed first area and said plurality of operations described in the pointed second area;

second table generating means for generating a second table indicating relationships between the variables specified by the area pointed by said second pointing means and said external parameters; and program generating means for converting from said selective choice constructs represented by said first list to source codes using said first table and said second table.

41. The information processing system as claimed in claim 40, wherein said first pointing means divides at least some of the conditional items into blocks, each of the blocks being associated with a different level of a tree structure, said information processing system further comprises third table generating means for generating a third table indicating conditional item sets formed by combining conditional items selected from the blocks, and said first table generating means registers the operations associated with said conditional item sets in the first table.

42. The information processing system as claimed in claim 40, further comprising sequence information forming means for forming, in the displayed first list, sequence information indicating a sequence of parameter values specified by the external parameters.

43. The information processing system as claimed in claim 40, wherein at least one of said conditional items specifies a plurality of said operations, and results produced by execution of the plurality of operations are associated with the external parameters.

44. The information processing system as claimed in claim 40, wherein the display means displays a second list related to the first list, and wherein said first pointing means points areas of conditional items and operations in the displayed second list, said second pointing means points areas of variables in conditional items and operations in the displayed second list, said variables being specified by the external parameters in the second list, said first table generating means further generates a third table indicating relationships between the conditional items and the operations in the second list, said second table generating means generates a fourth table indicating relationships between the pointed variables in the second list and the external parameters, said information processing system further comprising a third pointing means for pointing the first and second lists and their list names, and a third table generating means for generating a fifth table indicating relationships between the list names and address locations where the first and second lists are stored in a memory, at least one of said operations indicated in the first list including a name of the second list as one of the variables, and the conditional items in the second list being specified by values of the external parameters.

45. An information processing system comprising:

display means for displaying a first list wherein a plurality of conditional items of selective choice constructs are described in a first area and a plurality of operations of said selective choice constructs are described in a second area;

first pointing means for pointing respectively said first area and said second area in said displayed first list;

second pointing means for pointing areas existing in said first area and said second area in said displayed first list, wherein variables are described and values of said variables are specified by external parameters;

first table generating means for generating a first table indicating relationships between said plurality of conditional items described in the pointed first area and said plurality of operations described in the pointed second area;

second table generating means for generating a second table indicating relationships between the variables specified by the area pointed by said second pointing means and said external parameters;

means for inputting external parameters for specifying values of variables in the conditional items and in the operations in the displayed first list; and executing means for executing a logic of said selective choice constructs represented by said first list, using said first table and said second table and values of said inputted external parameters.

46. The information processing system as claimed in claim 45, wherein said first pointing means divides at least some of the conditional items into blocks, each of the blocks being associated with a different level of a tree structure, said information processing system further comprises means for generating a third table indicating conditional item sets formed by combining conditional items selected from the blocks, and said first table generating means registers the operations associated with said conditional item sets in the first table.

47. The information processing system as claimed in claim 46, further comprising searching means for searching the conditional item sets in the third table using the external parameters as a key to select the operations associated with said conditional item sets specified by the external parameters.

48. The information processing system as claimed in claim 45, wherein at least one of said conditional items specifies a plurality of said operations, and the results produced by execution of the plurality of operations are associated with the external parameters.

49. The information processing system as claimed in claim 45, wherein the display means displays a second list related to the first list, and wherein said first pointing means points areas of conditional items and operations in the displayed second list, said second pointing means points areas of variables in conditional items and operations in the displayed second list, said variables being specified by the external parameters in the second list, said first table generating means further generates a third table indicating relationships between the conditional items and the operations in the second list, said second table generating means generates a fourth table indicating relationships between the pointed variables in the second list and the external parameters, said information processing means further comprising a third pointing means for pointing the first and second lists and their list names, and a third table generating means for generating a fifth table indicating relationships between the list names and address locations where the first and second lists are stored in a memory, at least one of said operations indicated in the first list including a name of the second list as one of the variables, and the conditional items in the second list being specified by values of the external parameters.

50. An information processing method comprising the steps of;
  displaying a first list wherein a plurality of conditional items of selective choice constructs are described in a first area and a plurality of operations of said selective choice constructs are described in a second area;
  pointing respectively said first area and said second area in said displayed first list;
  pointing areas which exist in said first area and said second area in said displayed first list, wherein variables are described and values of said variables are specified by external parameters;
  generating a first table indicating relationships between said plurality of conditional items described in the pointed first area and said plurality of operations described in the pointed second area;
  generating a second table indicating relationships between the variables specified by the area pointed by said second pointing means and said external parameters; and
  converting from said selective choice constructs represented by said first list to source codes by using said first table and said second table.

51. The information processing method as claimed in claim 50, wherein the conditional items include column conditional items and row conditional items, and the operations are specified by selectively combining the column conditional items and the row conditional items.

52. The information processing method as claimed in claim 50, further comprising the step of dividing at least some of the conditional items into blocks, each of the blocks being associate with a different level of a tree structure; and the step of generating a third table indicating conditional item sets formed by combining conditional items selected from the blocks, and the step of registering the operations associated with said conditional item sets in the first table.

53. The information processing method as claimed in claim 50, further comprising the step of forming, in the displayed first list, sequence information indicating a sequence of parameter values specified by the external parameters.

54. The information processing method as claimed in claim 50, wherein at least one of said conditional items specifies a plurality of said operations, the method further includes the step of associating the results produced by execution of the plurality of operations with the external parameters.

55. The information processing method as claimed in claim 50, further comprising the steps of:
  displaying a second list related to the first list;
  pointing areas of conditional items and operations in the displayed second list on the basis of the instructions;
  pointing areas of variables in the selected conditional items and operations in the displayed second list, the pointed variables being specified by the external parameters in the second list on the basis of the instructions;
  generating a third table indicating relationships between the conditional items and the operations in the displayed second list;
  generating a fourth table indicating relationships between the pointed variables in the second list and the external parameters; and
  generating a fifth table indicating relationships between list names and locations where the first and second lists are stored in memory,
  wherein at least one of the operations in the first list includes the displayed second list name as one of the variables, and the conditional items in the second list are specified by values of the external parameters.

56. An information processing method comprising the steps of;
  displaying a first list wherein a plurality of conditional items of selective choice constructs are described in a first area and a plurality of operations of said selective choice constructs are described in a second area;
  pointing respectively said first area and said second area in said first list which is displayed;
  pointing areas existing in said first area and said second area in said displayed first list, wherein variables are described and values of said variables are specified by external parameters;
  generating a first table indicating relationships between said plurality of conditional items described in the pointed first area and said plurality of operations described in the pointed second area;
  generating a second table indicating relationships between the variables specified by the area pointed by said second pointing means and said external parameters;
  inputting external parameters for specifying values of variables in the conditional items and in the operations in the displayed first list; and
  executing a logic of said selective choice constructs represented by said first list, using said first table and said second table and values of said inputted external parameters.

57. The information processing method as claimed in claim 56, further comprising the step of dividing the conditional items in the first list into blocks, each of the blocks being associate with a different level of a tree structure; and the step of generating a third table indicating conditional item sets formed by combining conditional items selected from some of the blocks, and the step of registering the operations associated with said conditional item sets in the first table.

58. The information processing method as claimed in claim 57, further comprising the step of searching the conditional item sets in the third table using the external parameters as a key to select the operations associated with said conditional item sets specified by the external parameters.

59. The information processing method as claimed in claim 56, wherein at least one of said conditional items specifies a plurality of said operations, and the results produced by execution of the plurality of operations are associated with the external parameters.

60. The information processing method as claimed in claim 56, further comprising the steps of:

displaying a second list related to the first list;

pointing areas of conditional items and operations in the displayed second list on the basis of the instructions;

pointing areas of variables in the conditional items and operations in the displayed second list, the pointed variables being specified by the external parameters in the second list on the basis of the instructions;

generating a third table indicating relationships between the conditional items and the operations in the displayed second list;

generating a fourth table indicating relationships between the pointed variables in the second list and the external parameters; and generating a fifth table indicating relationships between list names and locations where the first and second lists are stored in memory, wherein at least one of the operations in the displayed first list includes the displayed second list name as one of the variables, and the conditional items in the second list are specified by values of the external parameters.

61. A memory storing computer-executable program code, comprising:

means causing a computer to display a first list wherein a plurality of conditional items of selective choice constructs are described in a first area and a plurality of operations of said selective choice constructs are described in a second area;

means causing the computer to point respectively said first area and said second area in said displayed first list;

means causing the computer to point areas which exist in said first area and said second area in said displayed first list, wherein variables are described and values of said variables are specified by external parameters;

means causing the computer to generate a first table indicating relationships between said plurality of conditional items described in the pointed first area and said plurality of operations described in the pointed second area;

means causing the computer to generate a second table indicating relationships between the variables specified by the area pointed by said second pointing means and said external parameters; and means causing the computer to convert from said selective choice constructs represented by said first list to source codes by using said first table and said second table.

62. A memory storing computer-executable program code, comprising:

means causing a computer to display a first list wherein a plurality of conditional items of selective choice constructs are described in a first area and a plurality of operations of said selective choice constructs are described in a second area;

means causing the computer to point respectively said first area and said second area in said first list which is displayed;

means causing the computer to point areas existing in said first area and said second area in said displayed first list, wherein variables are described and values of said variables are specified by external parameters;

means causing the computer to generate a first table indicating relationships between said plurality of conditional items described in the pointed first area and said plurality of operations described in the pointed second area;

means causing the computer to generate a second table indicating relationships between the variables specified by the area pointed by said second pointing means and said external parameters;

means causing the computer to input external parameters for specifying values of variables in the conditional items and in the operations in the displayed first list; and means causing the computer to execute a logic of said selective choice constructs represented by said first list, using said first table and said second table and values of said inputted external parameters.

* * * * *